June 9, 1925. 1,540,899
F. MÜLLER
COMBINED METAL CUTTING MACHINE
Filed Dec. 31, 1921 11 Sheets-Sheet 2

Inventor
Friederich Müller,
By Wayne B Wells
Attorney

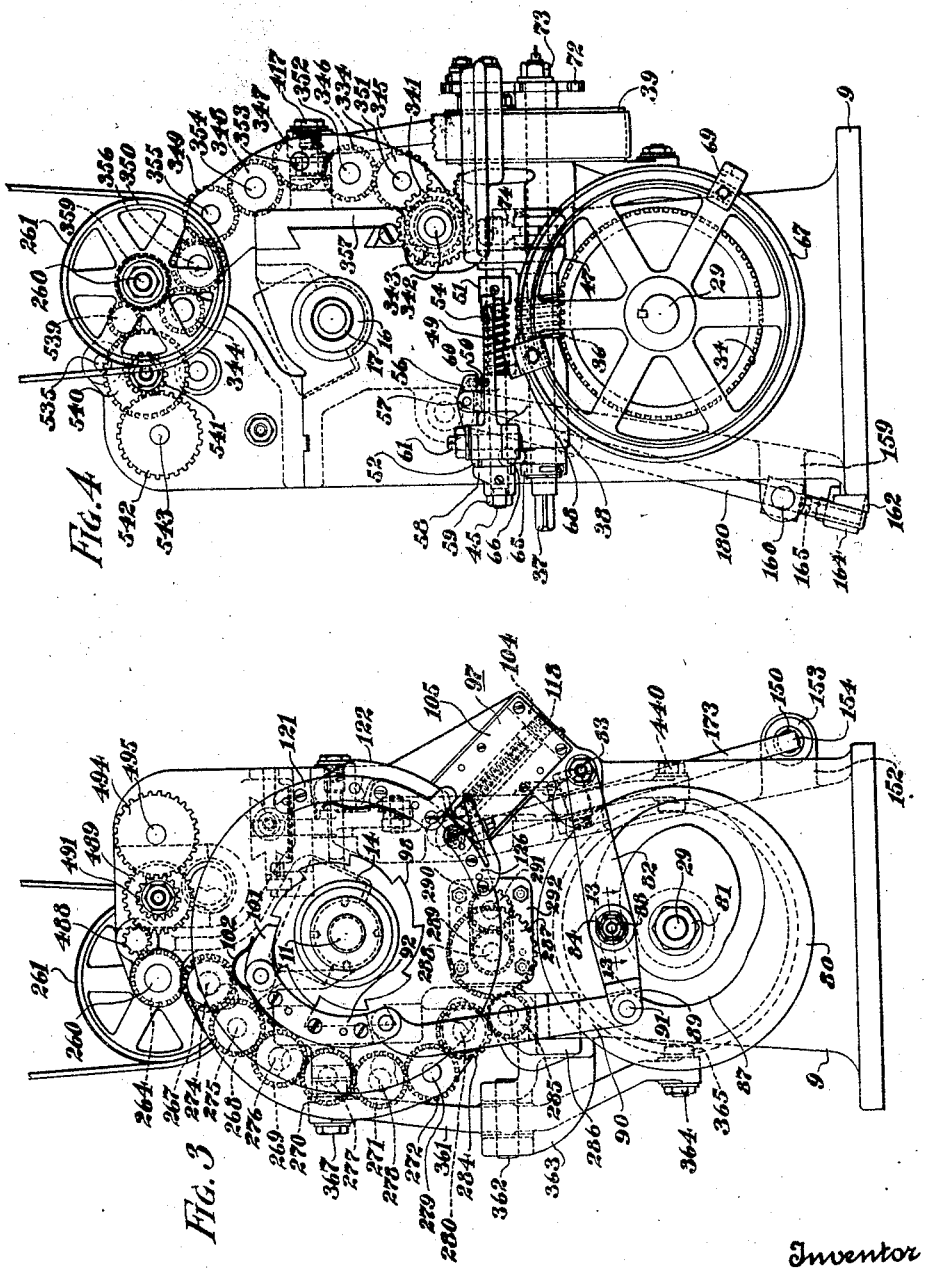

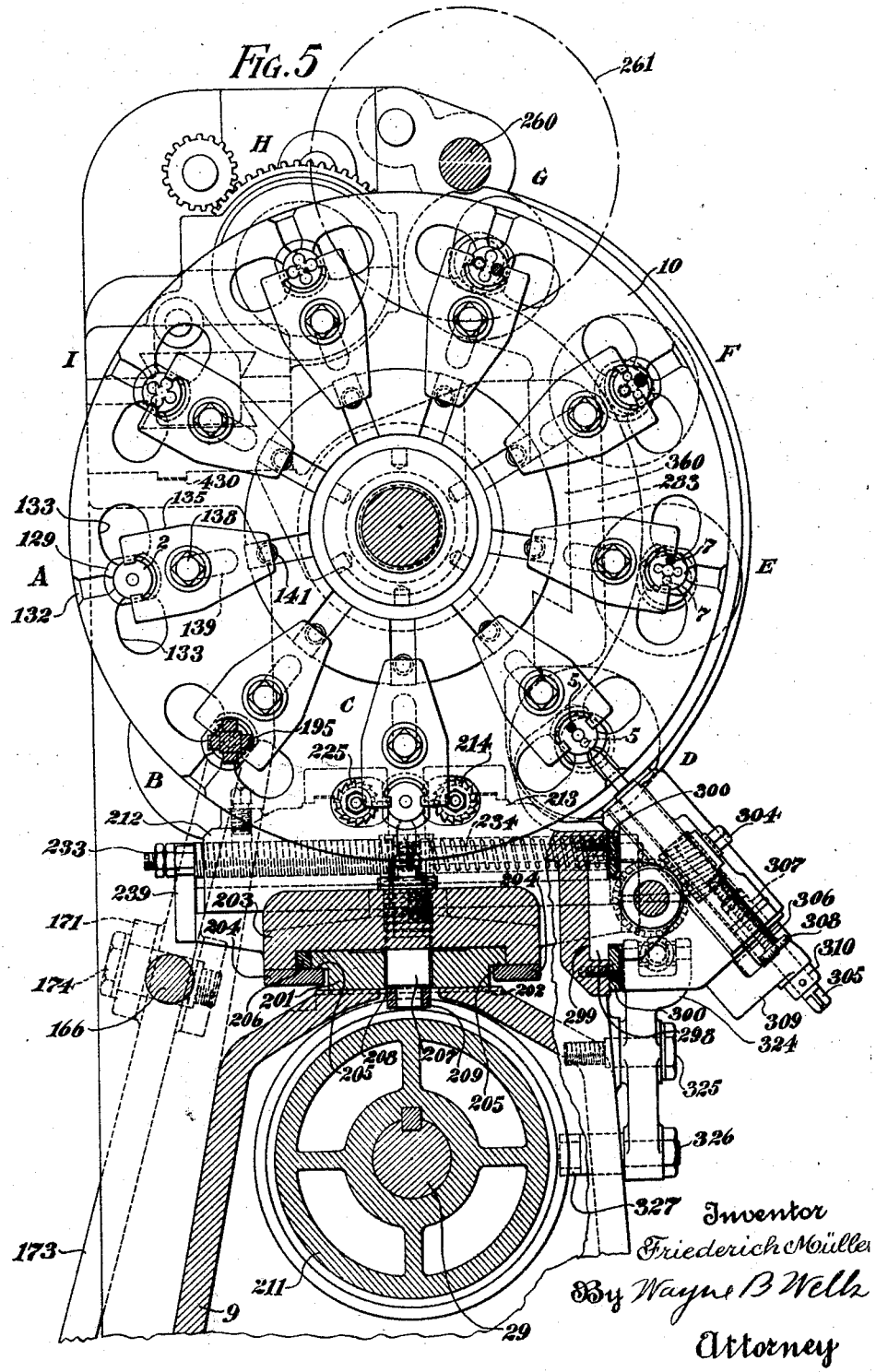

June 9, 1925. 1,540,899
F. MÜLLER
COMBINED METAL CUTTING MACHINE
Filed Dec. 31, 1921 11 Sheets-Sheet 5
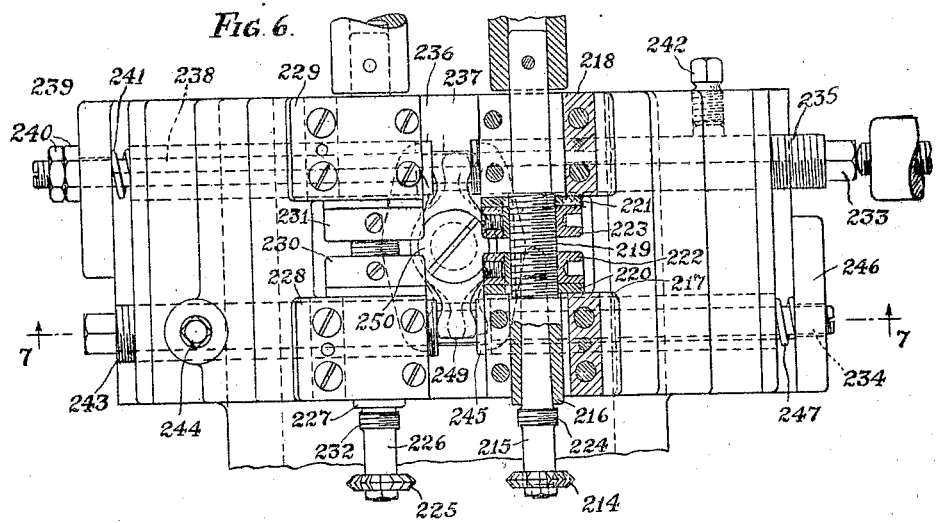
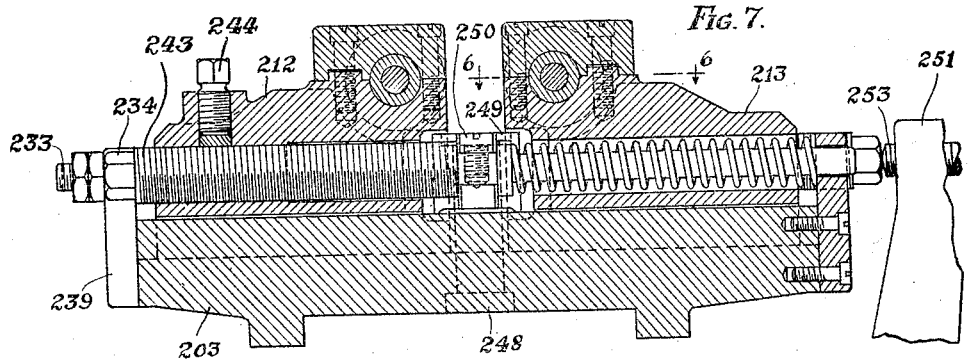
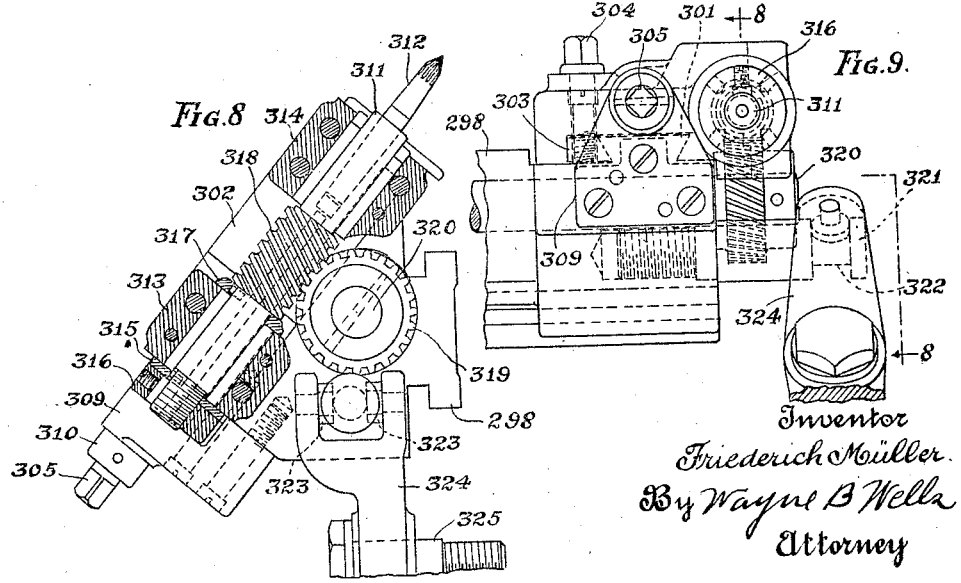
Inventor
Friederich Müller
By Wayne B Wells
Attorney June 9, 1925.  1,540,899

F. MÜLLER

COMBINED METAL CUTTING MACHINE

Filed Dec. 31, 1921   11 Sheets-Sheet 6

Inventor
Friederich Müller.
By Wayne B Wells
Attorney

June 9, 1925.  1,540,899
F. MÜLLER
COMBINED METAL CUTTING MACHINE
Filed Dec. 31, 1921     11 Sheets-Sheet 7
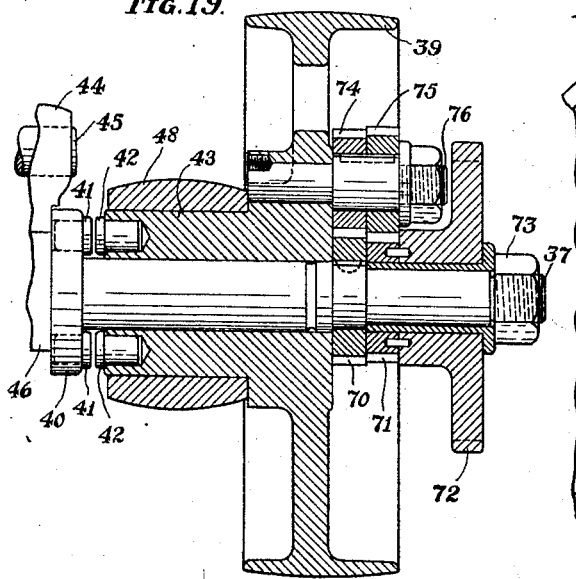
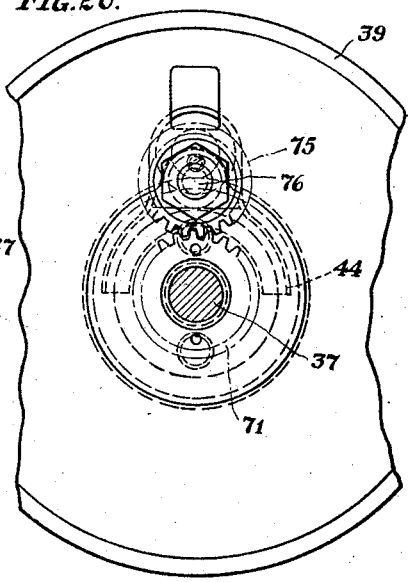
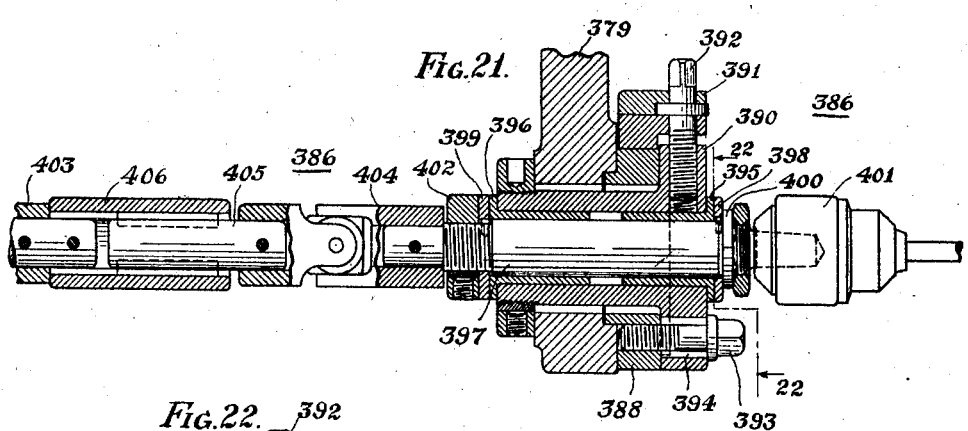
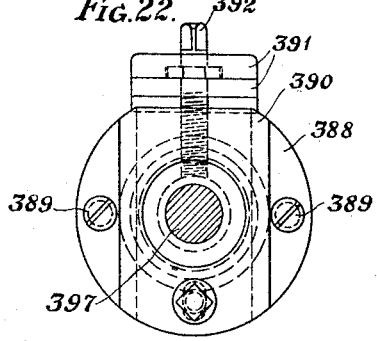
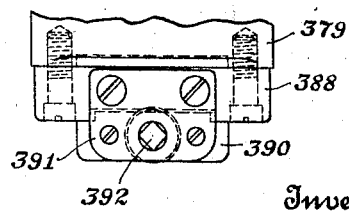
Inventor
Friederich Müller.
By Wayne B Wells
Attorney.

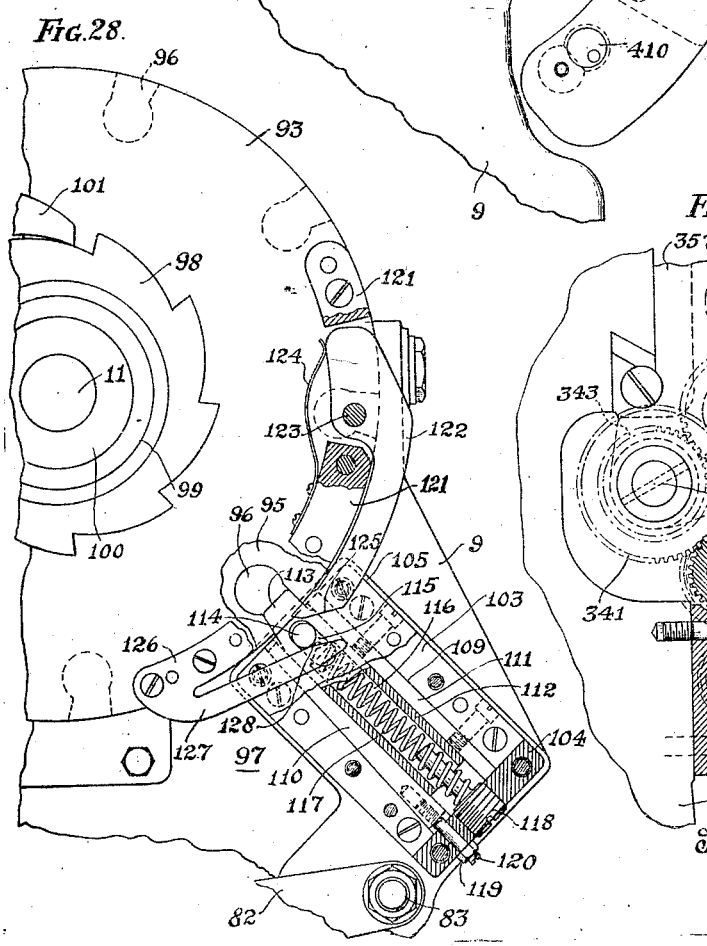

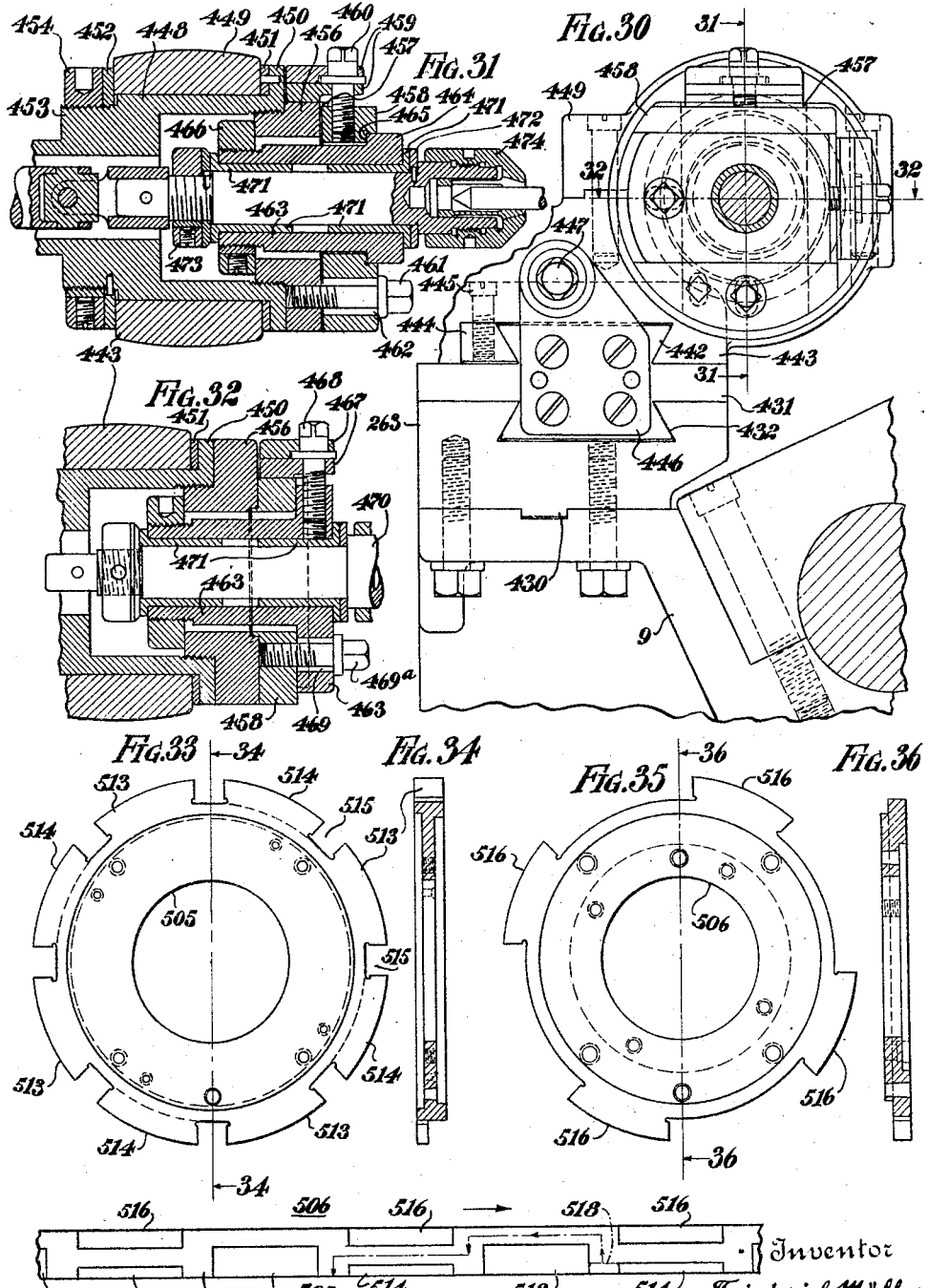

June 9, 1925.  1,540,899
F. MÜLLER
COMBINED METAL CUTTING MACHINE
Filed Dec. 31, 1921  11 Sheets-Sheet 10

Inventor
Friederich Müller
By Wayne B Wells
Attorney.

June 9, 1925.

F. MÜLLER 1,540,899

COMBINED METAL CUTTING MACHINE

Filed Dec. 31, 1921     11 Sheets-Sheet 11

Inventor
Friederich Müller
By Wayne B Wells
Attorney.

Patented June 9, 1925.

1,540,899

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

COMBINED METAL-CUTTING MACHINE.

Application filed December 31, 1921. Serial No. 526,121.

*To all whom it may concern:*

Be it known that I, FRIEDERICH MÜLLER, a citizen of the United States, residing at Hartford, in the county of Hartford and State of Connecticut, have invented certain new and useful Improvements in Combined Metal-Cutting Machines, of which the following is a specification.

My invention relates to machine tools and particularly to combined machines for making thread dies.

One object of my invention is to provide an automatic die making machine that shall simultaneously perform a number of operations on different blank dies at different stations and that shall move each blank die successively into operative relation to each station by an indexing operation.

Another object of my invention is to provide an automatic machine that shall comprise a turret carrying a plurality of blanks, means for indexing the turret to move each blank successively into operative relation to a drilling station, and means located at said station for cutting an axial slot in each blank and for drilling a hole through each blank from each side of the turret.

Another object of my invention is to provide an automatic machine that shall comprise a turret carrying a plurality of blanks, each having a tapped hole in the center thereof, means for indexing the turret to bring each blank successively into operative relation to drilling and counter-boring stations, means located at each of the drilling stations for simultaneously drilling two holes through each blank adjacent to the tapped hole, and means located at each counterboring station for simultaneously counterboring two of the drilled holes to extend into the tapped hole and form cutting edges.

Another object of my invention is to provide an automatic machine that shall comprise a turret carrying a plurality of blanks each having a tapped hole in the center thereof and having portions of the side of each tapped hole cut away to form cutting edges, means for indexing the turret to bring each blank successively into operative relation to a chamfering station, and means located at the chamfering station for relieving each cutting edge. Said chamfering means comprising a rotatable chamfering tool, a rotatable sleeve member for supporting the rotatable tool, means for varying the axis of rotation of the tool relative to the axis of rotation of the sleeve member, indexing mechanism comprising two notched plates mounted on said sleeve member, and means for operating said indexing mechanism to intermittently give the sleeve mechanism a movement of rotation while reciprocating the tool and the sleeve member to relieve the cutting edges on each blank adjacent to one side thereof.

A further object of my invention is to provide a combined machine that shall comprise a turret carrying a plurality of die blanks each having a tapped hole in the center, a plurality of stations for loading and unloading blanks in the turret, for stamping each blank, for drilling and counterboring holes in each blank to extend into the central or tapped hole and thus form cutting edges, for cutting grooves in the side of each blank, and for relieving each of said cutting edges either adjacent one side of each blank or adjacent both sides of each blank, and means for so indexing the turret as to bring each blank successively into operative relation to each station.

At the present time, in making the single piece so called button or split dies, it is customary to perform all the drilling, counterboring and auxiliary operations manually without the aid of automatic machinery. Such a method of manufacturing is not only expensive, but fails to produce dies as accurately as can be made by automatic machines.

In a machine constructed in accordance with my invention, a blank-carrying turret is provided which is automatically indexed to bring each of the blanks successively into operative relation to nine stations. The blanks, carried by the turret, are preferably shaped according to the desired shape of the finished blank, and each blank has a tapped hole in the center. Two of the nine stations serve as loading and unloading stations and preferably the loading and unloading of the blanks in the turret is effected manually. The blank, when inserted in the turret, is first moved to a stamping station where an imprint is made thereon from a fixed stamping die. The imprint, which is made in the blank, is located in fixed relation to the holes which are to be drilled and counterbored at other stations. It should be noted that the stamping operation is effected before the blank has been weakened by any drilling or slotting operation. At the present time it is customary to stamp the blanks as a final operation and in many cases such stamping operation distorts the blank.

Adjacent to the station for stamping the blanks is a station for cutting grooves in the side of each blank. The grooves serve as a means for fixedly holding the completed blank in a die stock. The grooving of each blank is accomplished by two milling cutters which are first moved axially into operative relation to the blank and then are moved transversely into engagement with the blank. Such axial and transverse movement of the milling cutters is controlled by cam members which are operated in timed relation to the indexing of the turret.

A slotting and drilling station is provided adjacent to the grooving station for cutting an axial slot in each blank and also for simultaneously drilling two holes through each blank adjacent to the tapped hole in the center. The slot, in the side of the blank, is cut by a pointed end milling cutter at the same time as the holes are being drilled through the blank, and preferably, the two holes in the blank are drilled from opposite sides of the turret. The drilling and slotting operations are controlled by cam members which are mounted on a cam shaft. The cam shaft also carries the cam members which control the stamping and grooving of the blanks. Moreover, the cam shaft controls the indexing of the turret and accordingly the drilling and the slotting operations are effected in timed relation to the indexing operation.

At the station adjacent to the drilling and grooving station, two additional holes are drilled in each blank. Such additional holes are drilled in spaced relation to the tapped hole in the center of the blank and to the two holes drilled at the last station. The holes are preferably drilled from opposite sides of the turret and the drilling is controlled by cam members which are mounted on the cam shaft. Means is provided at this station as well as at the drilling and slotting station to accurately adjust the position of the drilling tool in accordance with any desired size of blank.

The two stations adjacent to the drilling station contains similar apparatus which performs similar operations. In making a thread die, it is necessary to cut away portions of the side of the tapped hole in the center of the blank in order to form cutting edges. If portions of the side of the tapped hole were cut away by a drilling operation, it would be difficult to maintain the drill in correct alignment and, moreover, it would be difficult to prevent the drill from destroying the threads in the tapped hole at the center. Accordingly, holes are first drilled in the blank adjacent to the tapped hole and then such drilled holes are counterbored to extend into the tapped hole and form cutting edges. At the two stations adjacent to the drilling station such counterboring operations are effected. At each of said counterboring stations two of the drilled holes are counterbored and preferably one hole is counterbored from each side of the turret. The counterboring operations are controlled by cam members which are mounted on the cam shaft. Accordingly, the counterboring operations are effected in timed relation to the indexing of the turret.

At the station adjacent to the counterboring stations and next to the unloading station, the cutting edges, which have been formed on the blank, are relieved either adjacent one side of the blank or adjacent both sides of the blank. Preferably, the cutting edges are relieved adjacent both sides of the blank in order to permit the finished blank to be interchangeably fitted in a die stock. The relieving of the cutting edges is preferably effected by means of a chamfering tool. The chamfering tool is constantly rotated and is mounted in a sleeve mechanism which is indexed to permit the relieving of the various cutting edges. Means is provided for adjusting the axis of rotation of the chamfering tool relative to the axis of rotation of the sleeve mechanism in order to provide for accurately relieving the cutting edges in different sized blanks. The sleeve mechanism is mounted on a slide which is controlled by a cam member mounted on the cam shaft. Such slide is operated in accordance with the number of cutting edges which are to be relieved. In my preferred structure, the mechanism for indexing the sleeve mechanism comprises two notched plates which are fixedly mounted on the sleeve mechanism. Such notched plates are connected to a constantly rotating gear wheel by means of any suitable yieldable or friction clutch. The constantly rotating gear wheel is preferably mounted on the sleeve mechanism. A latch member, which is mounted on the above mentioned slide, is provided with a projecting portion which cooperates with the notches in the indexing plates to control the indexing operation in accordance with the movement of the slide. In the above mentioned structure, the slide serves to move the chamfering tool into engagement with the blank to relieve one cutting edge. Upon withdrawal of the chamfering tool, the sleeve mechanism is indexed to place the chamfering tool in position to be moved into engagement with the next cutting edge. If the cutting edges are to be relieved adjacent to each side of the blank, a chamfering tool is located on each side of the blank-carrying turret.

The above operations are performed simultaneously at the various stations. The blanks, when delivered at the unloading station, need only to have the slot, cut in the side thereof, extended into one of the drilled holes in order to be in condition for hardening.

In the accompanying drawings:

Fig. 3 is a left end elevational view of the machine, as shown in Fig. 1.

Fig. 4 is a right end elevational view of the machine, as shown in Fig. 1.

Fig. 5 is a sectional view taken along the line 5—5 of Fig. 1.

Fig. 6 is a plan view of the head members which carry the milling cutters for cutting grooves in the blanks.

Fig. 7 is a sectional view taken along the line 7—7 of Fig. 6.

Fig. 8 is a sectional view of the pointed end milling cutter mechanism, the section being taken along the line 8—8 of Fig. 9.

Fig. 9 is an end view of the pointed end milling cutter mechanism considering the axis of the cutter to be rotated to a horizontal position.

Fig. 19 is a sectional view of the differential gear mechanism which is connected to the pulley supplying power to the cam shaft.

Fig. 20 is an end view of the differential gear mechanism shown in Fig. 19.

Fig. 21 is a sectional view of one of the drilling heads and the flexible shaft connected to it.

Fig. 22 is a section taken along the line 22—22 of Fig. 21.

Fig. 23 is a partial plan view of one of the drilling heads.

Figs. 24 and 25 are respectively end and side views of a guide bushing bracket and a guide bushing plate.

Figs. 26 and 27 are detail views of a guide bushing and the means for holding it in the guide bushing plate.

Fig. 28 is a detail view of the plunger mechanism which coacts with the indexing dial plate.

Fig. 29 is a sectional view taken along line 29—29 of Fig. 2.

Fig. 30 is an end view of one of the chamfering heads.

Fig. 31 is a sectional view taken along the line 31—31 of Fig. 30.

Fig. 32 is a sectional view taken along the line 32—32 of Fig. 30.

Fig. 33 is a plan view of one of the chamfering indexing plates.

Fig. 34 is a sectional view taken along the line 34—34 of Fig. 33.

Fig. 35 is a plan view of the second chamfering indexing plate.

Fig. 36 is a sectional view taken along the line 36—36 of Fig. 35.

Fig. 37 is a developed view of the chamfering indexing plates.

Figure 11:
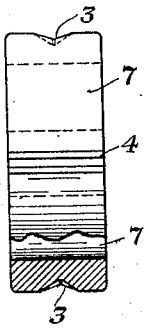
Figure 12:
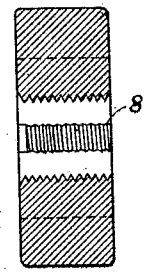
Fig. 12 is a sectional view taken along the line 12—12 of Fig. 10.
Figure 13:
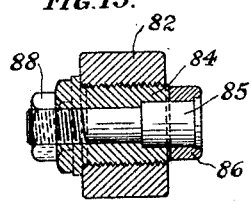
Fig. 13 is a sectional view of the rock-lever roller stud taken along the line 13—13 of Fig. 3.

Referring to the drawings a combined machine is shown having nine stations for operating on blanks to produce the so called button or split dies. A thread die adapted to be made in the machine is shown in Figs. 10, 11 and 12 of the drawings.

Figure 10:
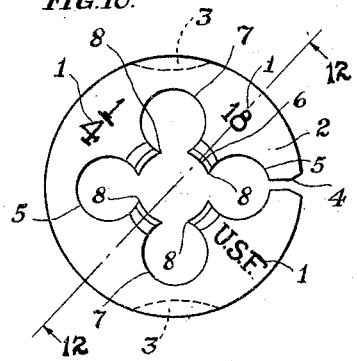
Figs. 10 and 11 are respectively end and side views of a completed thread die.

The blank, which is to be operated on in the machine, is shaped in accordance with the die shown in Fig. 10 and has a tapped hole in the center. Two of the stations of the machine serve to load and unload blanks in the blank-carrying member which is preferably a turret. The first operative station in the machine is provided with means for stamping the impressions 1, as shown on a die 2 in Fig. 10 of the drawings. At the next station in the machine, means is provided for cutting the grooves 3 in the side of the blank. At the next station an axial slot 4 is cut in the side of the blank and two holes 5 are drilled adjacent to a tapped hole 6 in the center of the blank. The station adjacent to the slotting and drilling station is provided with means for simultaneously drilling two holes 7. The four holes 5 and 7 are drilled adjacent to the tapped hole 6 but are not so drilled as to extend into the tapped hole 6. At the next two stations means are provided for counterboring the four drilled holes 5 and 7 to extend into the tapped hole 6 and form cutting edges 8. It should be noted that by counterboring the drilled holes 5 and 7, the threads in the tapped hole 6 are in no way distorted or mutilated. At the last operative station, means are provided for relieving the cutting edges 8 adjacent the top and bottom surfaces of the blank 2. Such relief, adjacent the top and bottom surfaces of the die, enable the finished blank to be easily started on a piece of work. The relief for cutting edges is produced by means of a chamfering operation, as will be hereinafter set forth. If so desired, the relieving of the cutting edges may be effected on one side only of the blank. However, it is preferable to relieve the cutting edges adjacent to the top and bottom surfaces of the blank.

The grooves 3, which are cut in the sides of the blank, serve as a means for attaching and holding the completed blank in a die stock. The slot 4, which is cut in the side of the blank adjacent to one of the holes 5, is extended into said hole after the blank has been removed from the machine. The extending of the slot 4 into the hole 5 and the hardening of the blank are the only operations necessary for completing a blank after it has been operated on by a machine constructed in accordance with my invention. Attention is also called to the fact that the stamping operation is effected before the blank has been weakened by drilling any holes through it, with the exception of the tapped hole in the center. Consequently, the blank is not distorted by such stamping operation.

Figure 1:
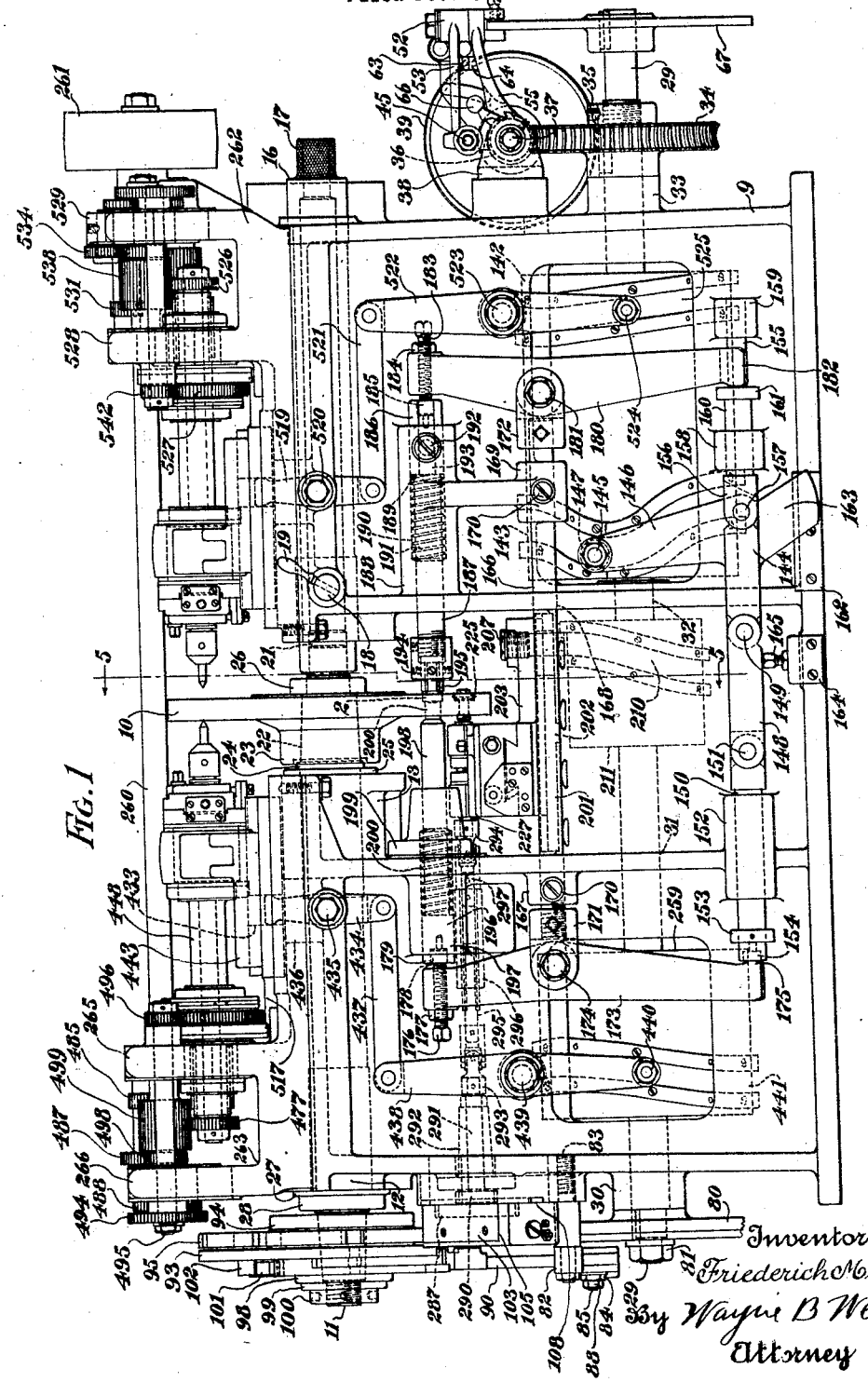
Figure 1 is a front elevational view of a machine constructed in accordance with my invention.
Figure 18:
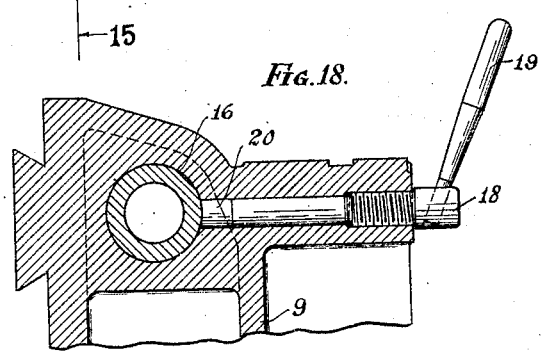
Fig. 18 is a sectional view of the means for holding the turret-supporting shaft in set position.

The machine shown in the drawings comprises a main frame 9, which supports a blank-carrying turret 10. The turret 10 is directly mounted on a turret shaft 11 which has bearings 12 and 13 in the main frame of the machine. The end of the shaft 11 adjacent to the turret 10 is supported in a hollow turret-supporting shaft 16. The shaft 16 is suitably mounted in the main frame of the machine and is provided with a knurled end portion 17 for adjusting its position in the frame. A screw 18, which is operated by a handle 19, is provided for holding the shaft 16 in any set position, as shown in Figs. 1 and 18 of the drawings. In Fig. 18 of the drawings, the screw 18 is shown in engagement with a shoe 20 which directly engages the turret-supporting shaft 16. Preferably, the shoe 20 is composed of brass. The end of the turret-supporting shaft 16 adjacent to the turret 10 is provided with a counterboring portion 21 which rotatably supports one end of the shaft 11.

The turret 10 is mounted on a tapered portion 22 of the shaft 11 and is provided with a hub portion 23 which engages a shoulder 24 on the shaft 11. A washer 25 is mounted on the shaft 11 adjacent the bearing 13. A nut 26 is provided on the shaft 11 for holding the turret 10 in engagement with the shoulder 24. The turret 10 is not only fitted to the tapered portion 22 of the shaft 11 but is also secured to such shaft by any suitable key. A washer 27 is mounted on the shaft 11 adjacent to the bearing 12 and is held in engagement with a shoulder portion on the shaft by means of a nut 28. Preferably, the washers 25 and 27 are pinned or keyed to the shaft 11 in any suitable manner.

A cam shaft 29 is mounted in the main frame 9 below the turret shaft 11. The cam shaft 29 is provided with bearings 30, 31, 32 and 33 in the main frame. The cam shaft 29 governs the indexing of the turret 10 and the turret shaft 11 to successively bring each blank carried by the turret into operative relation to each of the nine stations of the machine. The cam shaft 29 carries cam members which respectively control the operating means at the seven operative stations. Thus, the various operations performed at the seven operative stations of the machine are effected in timed relation to the indexing of the turret.

A worm wheel 34 is keyed to the shaft 29 adjacent to the bearing 33 and is held against longitudinal movement on the shaft by means of a nut 35 which is held in position on the shaft by means of a pin or set screw. The worm wheel 34 meshes with a worm member 36 which is fixedly mounted on a transverse shaft 37, as shown in Figs. 1 and 4 of the drawings. The transverse shaft 37 is supported by a bracket 38 which is suitably mounted on the main frame of the machine. A pulley wheel 39 is rotatably mounted on the shaft 37 and is adapted to be directly connected to such shaft by means of a clutch member 40. The clutch member 40 is slidably mounted on the shaft 37 and is keyed thereto in any suitable manner. When the clutch member 40 is moved towards the left, as shown in Fig. 4 of the drawings, the pulley 39 is connected to the shaft 37 through a set of gearing to be described. However, when the clutch member 40 is moved to the right, as shown in Fig. 4 of the drawings, projections 41 from the clutch member engage projections 42 from the hub 43 of the pulley 39 to directly connect the pulley to the shaft. The relation of the clutch to the hub 43 of the pulley is shown in Figs. 4 and 19 of the drawings. The clutch member 40 is controlled by a bifurcated member 44 which is mounted on a rod 45. The bifurcated member 44 is fitted to a groove 46 in the clutch member 40. The movement of the clutch member 40 is limited by bearing portions 47 and 48 in the bracket 38 for the shaft 37. The rod 45, which carries the bifurcated member 44, is slidably mounted in any suitable manner in the bracket 38. A spring member 49, which is mounted on the rod 45, is disposed between a portion 50 of the bracket 38 and a collar 51 which is fixedly connected to the rod 45. Thus, the spring member 49 exerts a force tending to move the rod 45 so as to directly connect the pulley wheel 39 to the shaft 37.

Figure 39:
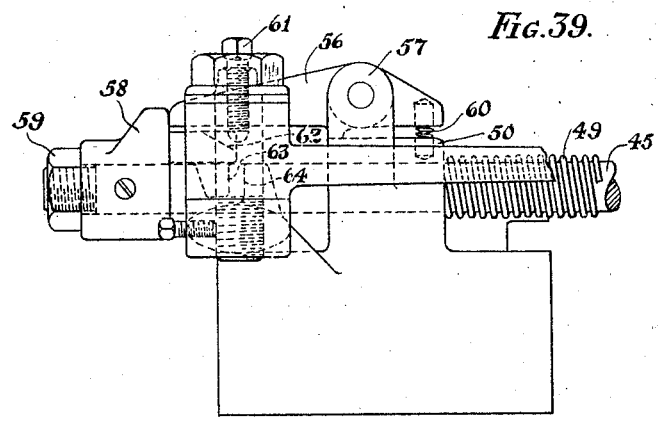
Fig. 39 is a detailed view of a portion of the mechanism operated by the shipper wheel.

A bell crank lever 52 having two arms 53 and 54 is rotatably mounted on an arm 55 which projects from the bracket 38, as shown in Figs. 1 and 4 of the drawings. The lever arm 53 serves not only to move the rod 45 against the action of the spring 49 but also to operate a latch member 56. The latch member 56 is pivotally mounted on a lug 57 which projects from the bracket 38. The latch member serves to engage a collar member 58 to hold the rod 45 in its extreme position towards the left, as shown in Fig. 4 of the drawings. The collar member 58 is connected to the rod 45 by a set screw and is held against longitudinal movement by means of a nut 59. A spring member 60 is disposed between one end of the latch 56 and the bracket 38 for holding the opposite end of the latch in the path of movement of the collar member 58. A screw 61, which extends through the latch 56, is adapted to be engaged by a cam surface 62 located near the end of the lever arm 53, as shown in Fig. 39 of the drawings. The lever arm 53, when given a movement of rotation in one direction, engages the collar 58 to move the rod 45 towards the left, as shown in Fig. 4 of the drawings. Such movement of the rod 45 operates the clutch member 40 to break the direct connection between the pulley 39 and the shaft 37. When the lever arm 53 is given a movement of rotation in an opposite direction, the cam surface 62 engages the screw 61 to raise the end of the latch member 53 out of engagement with the collar 58. When the latch 56 is raised above the collar 58, the spring member 49 effects a movement of the rod 45 towards the right, as shown in Fig. 4 of the drawings. Such movement of the rod 45 operates the clutch member 40 to effect a direct connection between the pulley 39 and the shaft 37. A lug 63, which projects from the lever arm 53, is adapted to engage a lug 64, which projects from the supporting arm 55, to limit the movement of the lever arm 53 when the rod 45 is operated to effect a direct connection between the pulley 39 and the shaft 37.

An eccentric member 65, which is rotatably mounted on the shaft 37 below the collar member 58, is controlled by a handle 66. The eccentric member is moved into engagement with the collar member 58 when it is desired to prevent movement of the rod 45 in accordance with the movement of the lever arm 53. When the rod is moved to the extreme left hand position, as shown in Fig. 4 of the drawings, the handle 66 may be operated to wedge the eccentric member 65 against the collar member 58 and thus prevent movement of the rod 45 when the latch 56 is operated by the lever arm 53.

The bell crank lever 52 is operated by means of a shipper wheel 67 which is fixedly mounted in any suitable manner near the end of the cam shaft 29. The shipper wheel carries adjustable lug members 68 and 69 which are adapted to engage the arm 54 of the bell crank lever 52 at predetermined times during the rotation of the cam shaft. One of the lug members, namely the lug member 68, is adapted to engage the end of the lever 54 so as to give the bell crank lever 52 a movement of rotation in a clockwise direction, as shown in Fig. 4 of the drawings. Such movement of the bell crank lever releases the latch 56 and effects a direct connection between the pulley 39 and the shaft 37. The second lug member 69, which is disposed an adjustable distance from the lug member 68, serves to give the bell crank lever 52 a movement of rotation in a counter-clockwise direction. Such movement of the bell crank lever serves to operate the clutch member 40 to break the direct connection between the pulley wheel 39 and the shaft 37.

Figure 2:
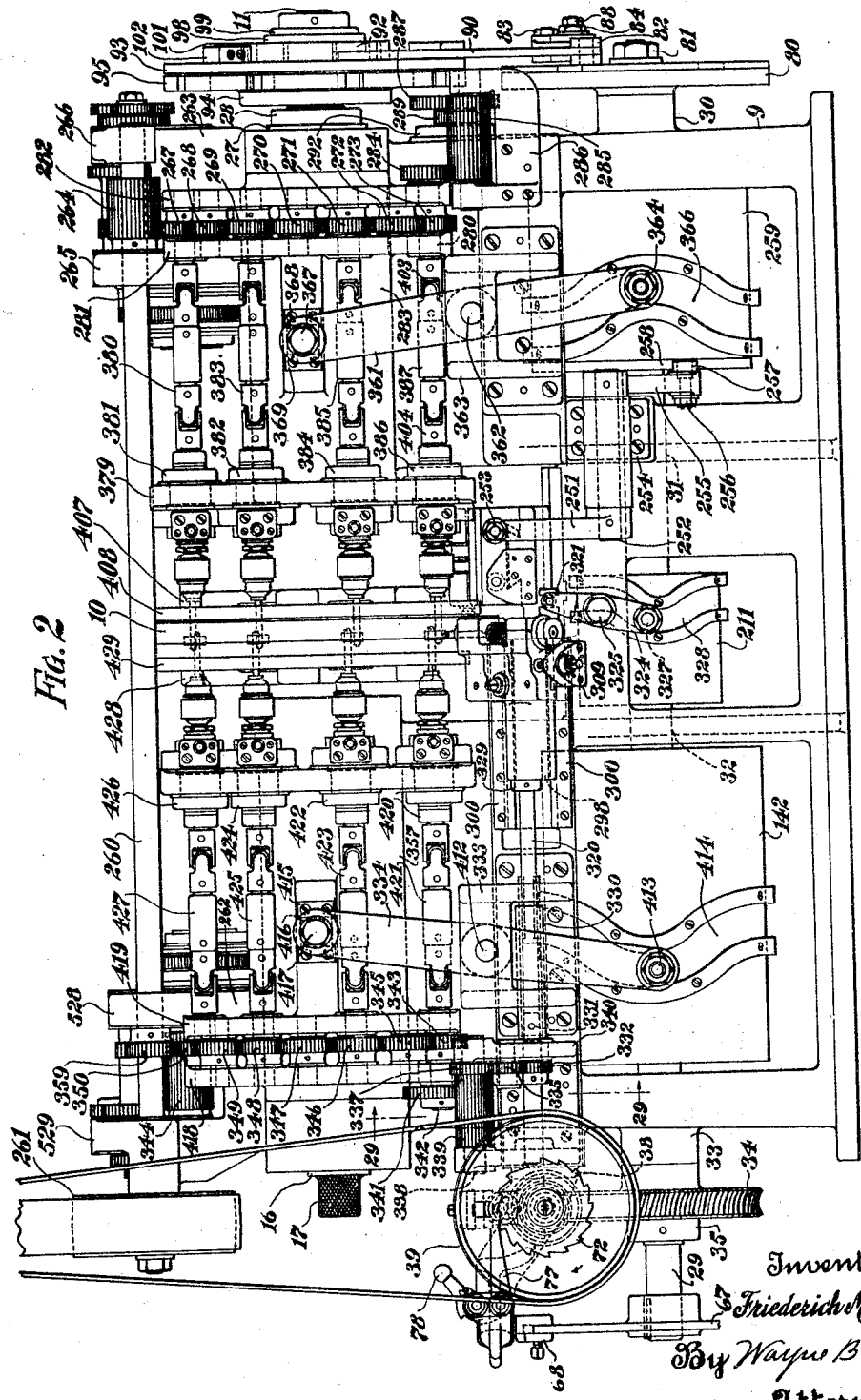
Fig. 2 is a rear elevational view of the machine shown in Fig. 1.

A gear wheel 70 is keyed to the shaft 37 adjacent to the pulley wheel 39, as shown in Fig. 19 of the drawings. A gear wheel 71 is mounted on the shaft 37 adjacent to the gear wheel 70 and is fixedly connected, in any suitable manner, to a ratchet wheel 72. The gear wheel 71 and the ratchet wheel 72 are rotatably mounted on the shaft 37 and are held against longitudinal movement by means of the nut 73, as shown in Fig. 19 of the drawings. The gear wheel 71, which is connected to the ratchet wheel 72, is smaller in diameter than the gear wheel 70, which is fixed to the shaft 29, for a purpose to be hereinafter set forth. Two gear wheels 74 and 75, which respectively mesh with the gear wheels 70 and 71, are mounted on a stud shaft 76 which projects from the web of the pulley wheel 39. The gear wheels 74 and 75 are rotatably mounted on the shaft 76 and are fixedly connected together in any suitable manner. The ratchet wheel 72 is adapted to be engaged by a pawl member 77 to prevent rotation of the ratchet wheel in a counter-clockwise direction under certain conditions, as shown in Fig. 2 of the drawings. The pawl member 77 is pivotally mounted upon the bracket 38 and may be raised out of engagement with the ratchet wheel 72 by means of a handle 78.

In the mechanism above described, it will be noted the shaft 37 carrying the worm member 36 is either directly connected to the pulley wheel 39 by means of the clutch member 40 to rotate at a rapid speed or is indirectly connected to such pulley wheel by means of the differential gearing comprising gear wheels 70, 71, 74 and 75. As shown in Fig. 2 of the drawings, the pulley wheel 39 is adapted to operate in a clockwise direction. Such movement of the pulley wheel 39 will effect movement of the cam shaft 29 in a clockwise direction, as shown in Fig. 4 of the drawings. When the clutch member 40 is disconnected from the pulley wheel 39, the gear wheels 74 and 75 acting through the gear wheels 70 and 71 tend to give the ratchet wheel 72 a rotative movement in a counter-clockwise direction, as shown in Fig. 2 of the drawings. However, the pawl 77 engages the ratchet wheel 72 and prevents rotation of the ratchet wheel 72 and the gear wheel 71. Inasmuch as the gear wheel 71 is held stationary, the gear wheels 74 and 75, in a well known manner, effect rotation of the gear wheel 70 to rotate the shaft 37 at a relatively low speed. The speed of rotation of the shaft 37 is dependent upon the difference in size between the gear wheels 70 and 71.

The shipper wheel 67 and the parts controlled thereby effect operation of the cam shaft 29 at a relatively rapid rate when the turret 10 is being indexed from one position to another position. Moreover, the shipper wheel effects operation of the cam shaft 29 at a relatively slow rate after the turret has been indexed to a new position and the means located at the various stations are operating on the blanks carried by the turret.

Referring to Fig. 4 of the drawings, the shipper wheel 67 is shown rotating in a clockwise direction. The lug member 68 is shown in position just before moving the bell crank lever 52 to directly connect the pulley 39 with the shaft 37 through the clutch 40. During the time that it takes the cam shaft 29 and the shipper wheel 67 to rotate so as to operate the bell crank lever 52 by the lug member 69, the indexing of the turret 10 is being effected. The lug member 69 engages the bell crank lever 52 to operate the clutch member 40 so as to connect the pulley 39 to the shaft 37 through the differential gearing. At such time, the operating means located at the various stations operate on the blanks carried by the turret. The shipper wheel 67 and the cam shaft 29 are given a movement of rotation at a relatively rapid rate during the indexing operation.

A cam member 80, which is mounted on the cam shaft 29 adjacent to the bearing 30, is provided for effecting an indexing operation of the turret 10 and the turret shaft 11. The cam member 80 is keyed to the shaft 29 and is held against longitudinal movement by means of a nut 81. A rock lever 82 is pivotally mounted on a stud bolt 83 which is secured to the main frame of the machine. A rock lever nut 84 is mounted on the rock lever 82 intermediate the ends thereof, as shown in Figs. 1, 2, 3 and 13 of the drawings. A roller stud 85 is rotatably mounted in the nut 84 and carries a roller 86 which is adapted to operate in a cam groove 87 formed in the cam wheel 80. The roller stud 85 is held in position in the rock lever nut 84 by means of a nut 88.

A bifurcated end portion 89 of the rock lever 82 is pivotally connected to a pawl lever 90 by means of a pin 91. The pawl lever 90 is pivotally connected to a pawl plate 92 which is secured in any suitable manner to an indexing motion plate 93. The motion plate 93 is rotatably mounted on a bushing 94, as shown in Figs. 1, 2, 3 and 28 of the drawings. The bushing 94 is mounted on the turret shaft 11 adjacent to the nut 28 and is preferably not only fitted to a tapered portion of the shaft 11 but is also keyed to such shaft. An indexing dial plate 95, which has nine equally spaced notches 96 formed in the periphery thereof, is fixedly mounted on the bushing 94. The notches 96 correspond to the nine stations of the machine. Seven of such stations, as heretofore set forth, are operative stations and two of the stations are loading and unloading stations. The notches 96 in the indexing dial plate cooperate with a plunger mechanism 97 to hold the turret shaft 11 and the turret 10 in any set position while the means at the various stations are operating on the blanks. A ratchet wheel 98 is mounted on and secured to the bushing 94 adjacent to the motion plate 93. A washer 99 is pinned to the shaft 11 adjacent to the ratchet wheel 98 and a nut 100 is secured to the shaft 11 adjacent to the washer 99 for holding the bushing 94 and any of the parts carried thereby against longitudinal movement. Preferably, the nut 100 is provided with a set screw for insuring against any movement of it on the shaft 11. The pawl plate 92 carries a pawl 101 which is adapted to engage the teeth on the ratchet wheel 98. A spring member 102 is provided for holding the pawl 101 in engagement with the ratchet wheel 98. It is apparent the rotation of the cam member 80 serves to reciprocate the rock lever 82. The rock lever 82, operating through the pawl lever 90, serves to give the motion plate 93 an oscillatory movement of rotation. During the movement of the motion plate 93 in a clockwise direction, as shown in Figs.

3 and 28 of the drawings, the pawl 101 engages the ratchet wheel 98 to index the shaft 11 and the turret 10 from one position to the next position.

The plunger block mechanism comprises a block member 103 which is bolted to the main frame 9 of the machine. An L shaped cap member 105 is provided for covering the top and one end of the block member. The top portion of the cap 105 is shown broken away in Fig. 28 of the drawings. An end portion 104 of the cap is bolted to the block 103 in the portion shown in Fig. 28. The block member 103 is provided with a projecting portion 108, as shown in Fig. 1 of the drawings, which is fitted to a groove cut in the main frame 9 in order to securely hold the plunger block in a set position. A channel 109 is formed within the block 103 and within such channel are fitted gib members 110 and 111 and a plunger 112. The plunger 112 is provided with an end portion 113 which is adapted to fit in the notches 96 formed in the indexing dial plate 95. The plunger carries a pin 114 which projects through a slot 115 in the plunger block cap for a purpose to be hereinafter set forth. A hole 116 is formed in the plunger 112 for carrying a spring member 117. One end of the spring member 117 abuts against the plunger 112 whereas the other end thereof abuts against a plunger screw 118 which extends through the end portion 104 of the plunger block cap 105.

A bolt 119, which extends through a hole in the end portion of the plunger block cap 105, is fitted to a tapped hole in the tapered gib member 110. The bolt 119 serves to adjust the gib member 110 in a direction towards the right, as shown in Fig. 28 of the drawings. A second bolt 120, which is fitted to a tapped hole in the end portion 104 of the plunger block cap 105, engages the end of the tapered gib member 110 and serves to effect adjustment of such gib member towards the left, as shown in Fig. 28 of the drawings. The spring member 117 exerts a force at all times tending to force the end portion 113 of the plunger in one of the notches of the indexing dial plate 95.

A latch plate 121 is secured to the motion plate 93, in any suitable manner, and carries a latch member 122. The latch member 122 is adapted to engage the pin 114 which projects from the plunger 112 through the plunger block plate 105, as shown in Fig. 28 of the drawings. The latch member 122 is pivotally supported on the latch plate 121 by means of a pin 123. A spring member 124, which is secured to the latch plate 121, engages one end of the latch member 122 and serves to force the opposite end thereof in position to engage the pin 114. The end of the latch member 122 is provided with a cam surface 125 which engages the pin 114. Thus, when the motion plate 93 is given a movement of rotation in a clockwise direction, as shown in Figs. 3 and 28, the latch member 122 first engages the pin 114 to force the end 113 of the plunger 112 out of one of the notches 96 in the indexing dial plate 95. After the plunger 112 has been withdrawn from engagement with the indexing dial plate, the pawl 101 engages the ratchet wheel 98 to index the turret shaft 11 and the turret 10.

A plunger lock member 126 is suitably secured to the motion plate 93 adjacent to the plunger mechanism 97. The plunger lock member 126 is provided with an arm 127 having a cam surface 128 near the end thereof which is adapted to engage the pin 114. The cam surface 128 engages the pin 114, when the motion plate 93 is given a movement of rotation in a counter-clockwise direction, and locks the plunger 112 in engagement with the indexing dial plate 95 until the motion plate is given a movement of rotation in a clockwise direction for the next indexing operation.

Figure 14:
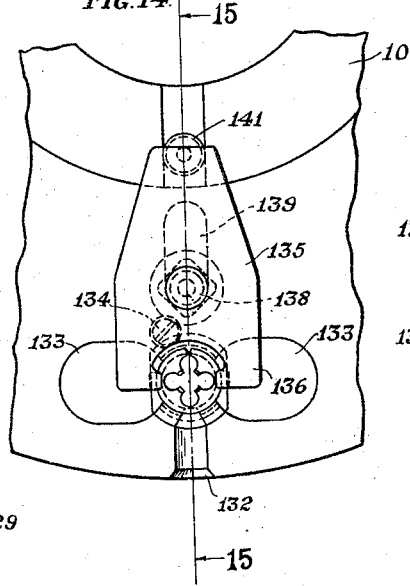
Fig. 14 is a fragmentary view showing the means for holding a blank in the turret.
Figure 15:
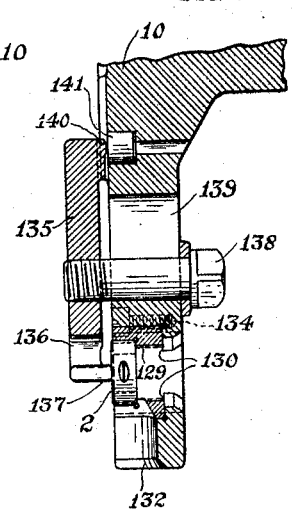
Fig. 15 is a sectional view taken along the line 15—15 of Fig. 14.
Figure 16:
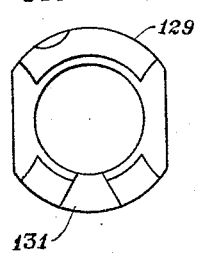
Figs. 16 and 17 are plan and end views of a work bushing.
Figure 17:
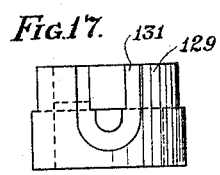

The turret is adapted to carry the nine blanks, seven of which are to be simultaneously operated on at the various stations of the machine. Each of the blanks 2 is mounted in the turret 10 in a similar manner, and a description of the mounting of only one blank in the machine will be given. The blank is fitted to a work bushing 129, shown in Figs. 14, 15, 16 and 17 of the drawings. The work bushing is fitted to a hole in the turret 10 and rests on shoulders 130, as shown in Figs. 14 and 15 of the drawings. When so mounted in the turret, the blank can be operated on from either side of the turret. The work bushing 129 is cut away at 131 in order to permit the cutting of the slot 4 in the blank 2. A portion of the turret 10 is cut away at 132 for the insertion of the tool which cuts the slot 4 in the blank. The sides of the work bushing 129 are cut away in order to permit the operation of milling cutters for cutting the grooves 3 in the sides of the blank. The turret 10 is provided with elliptical openings 133 which are located on either side of the work bushing 129 to permit the insertion of milling cutters for cutting the grooves 3 in the side of the blank 2. The work bushing 129 is held in position in the turret by means of a screw 134.

The blank 2 is held in position in the work bushing by means of a clamping member 135. The clamping member is provided with a bifurcated end portion 136 which has projecting portions 137 to engage the blank. The clamping member is secured to the turret by means of a bolt 138 which extends through a slot 139 in the turret. The bolt is preferably threadably connected to the clamping member 134, as shown in Fig. 15 of the drawings. The end of the clamping member 135, opposite to the bifurcated end portion 136, is provided with a projecting lug 140. The lug 140 engages a wearing plug 141 which is set in the turret. In order to unlock a blank from the turret, it is only necessary to loosen the bolt 138 and raise it in the slot 139, thus loosening the blank which may be removed from the work bushing 129. A new blank is then placed in the work bushing and the clamp 135 is fastened in position.

The machine has nine stations, as indicated in Fig. 5 of the drawings. At station A the blanks 2 are successively loaded in the work bushings 129 of the turret. Considering the turret 10 to rotate in a counter-clockwise direction, as shown in Fig. 5 of the drawings, the first operative station encountered by a blank, after being loaded in the turret, is the stamping station B. The station adjoining the stamping station B is the grooving station C where the grooves 3 are cut in the side of each blank. At the station D, which adjoins the grooving station, the two holes 5 are simultaneously drilled through the blank. Moreover, at such station D the slot 4 is cut in the side of the blank. The station E is a drilling station at which the two holes 7 are drilled adjacent to the tapped hole 6 in the center of the blank. At station F, which adjoins the drilling station E, the two holes 5, which were drilled at station D, are so counterbored as to extend into the tapped hole 6 to form cutting edges. The station G is similar to the station F with the exception that the two holes 7, which are drilled at station E, are counterbored to extend into the tapped hole 6 and form cutting edges. The last operative station H is provided with means to chamfer either or both sides of the blank in such manner as to relieve the cutting edges of the blank adjacent either the top or bottom surface of the blank or adjacent both surfaces of the blank. The last station I serves as an unloading station for removing the blanks 2 from the turret.

Referring to Figs. 1, 3 and 4, a description will be given of the apparatus employed at station B for stamping each of the blanks 2. A cam drum 142, which is keyed to the cam shaft 29 between the bearings 32 and 33, is provided with a cam groove 143. The cam groove 143 serves to govern the operation of the stamping mechanism at station B. A cam lever 144 is provided with an arm 146 on which is mounted a roller stud 145. The stud 145 carries a roller member 147 which is fitted to the cam groove 143 in the cam drum 142. A shaft link 148, which has bifurcated end portions, is pivotally connected by a pin 149 to the cam lever 144, as shown in Fig. 1 of the drawings. The other bifurcated end portion of the shaft link 148 is pivotally connected to a shaft 150 by means of a pin 151. The shaft 150 has a bearing 152 on the frame 9 of the machine. An adjustable collar member 153 is secured to the shaft 150 in any suitable manner and serves to engage the bearing 152 to limit the longitudinal movement of the shaft towards the right, as shown in Fig. 1 of the drawings. A wearing button 154 is fitted to the end of the shaft 150.

A shaft 155 having a bifurcated end portion 156 is secured to the cam lever 144 by means of a pin 157. The shaft 155 is supported in bearings 158 and 159 which project from the side of the main frame 9. The diameter of the shaft 155 is larger at the bearing 158 than at the bearing 159; and consequently, a shoulder 160 is formed between such bearings. A collar member 161, which is secured to the shaft 155 adjacent to such shoulder portion, serves to engage the bearing 158 to limit the movement of the shaft 155 towards the left, as shown in Fig. 1 of the drawings.

A plate 162, which is bolted to the base of the frame 9, serves to engage a projecting portion 163 of the cam lever 144 to maintain the roller member 147 in the cam groove 143. A block member 164 is secured to the base of the frame 9 adjacent to the plate 162. The block member 164 carries an adjustable bolt 165, which serves to support the shaft link 148, as shown in Figs. 1 and 4 of the drawings.

A lever rod 166 is supported in the main frame 9 of the machine at 167, 168 and 169. Set screws 170 are provided for preventing longitudinal movement of the lever rod 166. Lever blocks 171 and 172 are secured to the respective ends of the lever rod 160 and preferably are held in set position by means of set screws. The lever block 171 is provided with a bifurcated portion which is pivotally connected to a lever 173 by means of a pin 174. One end of the lever 173 is provided with a projecting portion 175 which is adapted to engage the wearing button 154 in the end of the shaft 150. The opposite end of the lever 173 carries a bolt 176 which is held in any set position by a nut 177. The bolt 176 is adapted to engage a wearing button 178 in the end of an anvil shaft 179.

The lever block 172, which is secured to one end of the lever rod 166, is provided with a bifurcated end portion which is secured to a lever 180 by means of a pin 181. The lever 180 is provided with a bifurcated end portion 182 which is fitted to the shaft 155. The bifurcated portion 182 of the shaft 180 is provided with projecting or wearing portions which are adapted to engage the collar 161. The opposite end of the lever 180 carries a bolt 183 which is held in any set position by a nut 184. The bolt 183 is adapted to engage a wearing button 185 in the end of a ram shaft 186. The ram shaft 186 is provided with a portion 187 which projects through a bearing 188 in the frame 9 of the machine. The portion 187 is located adjacent to the blank which has been indexed to station B. The end of the ram shaft 186, which carries the wearing button 185 is somewhat larger in diameter than the portion 187 so as to form a shoulder 189. A portion 190 of the bearing 188 is formed to fit the enlarged portion of the ram shaft 186. Within such enlarged portion of the bearing is located a spring member 191. One end of the spring member abuts against a shoulder formed in the bearing and the other end abuts against the shoulder 189 which is formed on the ram shaft 186. Such spring member 191 serves to hold the ram shaft in engagement with the lever 180. A ram screw 192, which extends into the bearing 188, is so shaped as to fit in a keyway 193 cut in the enlarged portion of the ram shaft 186. Such ram screw serves to insure the ram shaft against any rotative movement.

A stamping die holder 194 is threadably connected to the end 187 of the ram shaft 186. Preferably, the stamp holder is held in such position on the ram shaft by a set screw. A stamping die 195 is secured in the end of the stamp holder 194 in any suitable manner and preferably by means of set screws. The stamping die 195 stamps an impression in the blanks 2 as they are successively indexed to position B. The stamping die 195 is so positioned as to form impressions in the blank at points between the holes 5 and 7 which are to be drilled in each blank at stations D and E.

The anvil shaft 179 is aligned with the ram shaft 186. However, the ram shaft and the anvil shaft are disposed on opposite sides of the turret 10. The anvil shaft 179 is provided with an enlarged portion 196 which is provided with a bearing 197 in the frame 9 of the machine. The enlarged portion 196 of the anvil shaft carries the wearing button 178. A middle portion 198 of the anvil shaft is of much smaller diameter and is provided with a bearing in a hub member 199 which is secured in any suitable manner to the main frame 9 of the machine. A spring member 200 is located on the shaft 179 within an enlarged portion formed in the bearings. One end of the spring member abuts against a shoulder formed on the shaft and the other end thereof abuts against a shoulder formed in the hub member 199. Such spring member exerts a force tending to hold the anvil shaft in engagement with the end of the lever 173. The anvil shaft is provided with a reduced end portion 201 which projects into the turret 10 to engage the blank.

The stamping mechanism is shown in Fig. 1 of the drawings in position for effecting an impression of the stamping die 195 on a blank. In such position of the stamping mechanism, the cam lever 144 has been so moved by the cam groove 143 in the cam drum 142 as to straighten a toggle joint that is formed by the shaft link 148 and a portion of the cam lever 144. When an impression of the stamping die is being made on the blank, the toggle joint formed by the shaft link and the cam lever are so positioned as to have the pins 157, 149 and 151 substantially in alignment. In moving the cam lever 144 and the shaft link 148 to such position, the lever 173 is given a movement of rotation in a clockwise direction and the lever 180 is given a movement of rotation in a counter-clockwise direction. Such movement of the levers 180 and 173 forces the ram shaft 187 and the anvil shaft 179 against the action of the spring members 191 and 200 into engagement with opposite sides of the blank. After an impression has been made in the blank 2, the cam slot 143 so operates the cam lever 144 as to raise the pin 149 above the pins 151 and 157 and thus loosen the so called toggle joint. At such time the spring members 191 and 200 move the ram shaft and the anvil shaft away from the blank 2 and the turret 10 to permit the indexing of the turret 10 to bring another blank into operative relation to the stamping station.

Referring to Figs. 1 to 7, inclusive, the grooving operation, which is accomplished at station C, will be described. The grooves 3 are cut in the side of a blank 2 simultaneously and at the same time as the other stations are operating on various other blanks. The grooving head slide plate 201 is directly secured to the main frame 9 of the machine by means of bolts. A projecting portion 202 on the plate is fitted to a slot in the main frame 9 in order to insure the plate against any longitudinal movement during the operation of the machine. A grooving head slide 203 is mounted on the plate 201. The slide 203 is provided with strap members 204 which engage shoulder portions 205 on the plate 201, as shown in Fig. 5 of the drawings. The straps 204 are suitably connected to the slide 203 by screws, and a gib member 206 is preferably disposed between the slide 203 and the plate 201, as shown in Fig. 5 of the drawings. A stud 207, which is threadably connected to the slide 203, as shown in Figs. 1 and 5 of the drawings, projects through an elongated slot 208 in the plate 201. A roller member 209, which is mounted on the end of the stud 207, operates in a cam groove 210. The cam groove 210 is formed on a cam drum 211. The cam drum 211 is mounted on and keyed to the cam shaft 29.

Two grooving heads 212 and 213 are directly mounted on the slide 203 and are adapted to have movement perpendicularly to the movement of the slide 203 on the plate 201. The grooving head 213 carries a milling cutter 214 which is mounted on a cutter arbor 215. The cutter arbor 215 is fitted to a cutter spindle 216 which is carried by bearings 217 and 218 on the grooving head. The cutter spindle 216 is provided with a threaded portion 219 between the bearings 217 and 218. Two washers 220 and 221 are splined to the threaded portion 219 adjacent to the two bearings 217 and 218. Adjacent to the two washers are provided nuts 222 and 223 which preferably are held in position by means of set screws. The washers 220 and 221 and the nuts 222 and 223 serve to insure the cutter 214 and the cutter spindle against any longitudinal movement in the grooving head 213. The cutter arbor 215 is provided with a threaded portion 224 for engaging a nut to effect removal of the arbor from the cutter spindle at any time desired.

A milling cutter 225 is mounted on a cutter arbor 226 adjacent to the milling cutter 214. The arbor 226 is supported in a spindle 227 which in turn is supported in two bearings 228 and 229 on the grooving head 212. The cutter spindle 227 is similar in construction to the cutter spindle 216 and is provided with nuts 230 and 231 which insure the spindle against any longitudinal movement in the grooving head. A threaded portion 232 is provided for engaging a nut to effect removal of the arbor 226 from the spindle 227 at any time desired.

Two adjusting screws 233 and 234, which project through the gooving heads 212 and 213, serve to adjust the two milling cutters 214 and 225 transversely with respect to each other. The milling cutters are moved transversely for engaging the blank to cut the pair of grooves therein. The movement of the grooving heads 212 and 213 and the grooving head slide 203, which is effected by the cam groove 210 as heretofore set forth, serves to move the milling cutters longitudinally into position for cutting the grooves in the side of a blank. During the indexing operation the milling cutters are located back of the turret 10. Upon completion of the indexing operation, the cam groove 210 operates the slide 203 to move the milling cutters 214 and 225 longitudinally through the elongated openings 133 in the turret into position for cutting the grooves in the side of a blank. The milling cutters are constantly rotated from a source of power, as will be hereinafter described, and upon a transverse movement or a movement of the cutters towards each other, the grooves 3 are cut in the side of the blank. A portion 235 of the adjusting screw 233 is threadably connected to the grooving head 213. A collar 236 is mounted on the screw 233 beyond the threaded portion 235 and a reduced portion 237 is located between the collar 236 and the threaded portion 235 for a purpose to be hereinafter set forth. A reduced portion 238 of the screw 233 projects through the head 212 and an end plate 239 which is secured to the slide 203. The opening in the head 212 through which the screw 233 passes is of such size as to permit the ready movement of the collar portion 236 therethrough. Nuts 240 are connected to the screw 233 beyond the plate 239 for limiting the movement of the screw towards the right, as shown in Fig. 6 of the drawings. A spring member 241 is mounted on the screw 233 between the plate 239 and a collar 236. Such spring member exerts a force tending to move the screw and the head 213 towards the right, as shown in Fig. 6 of the drawings. A set screw 242 is provided in the head 213 for engaging the screw 233 to insure the holding of the screw 233 in any set position.

The screw 234 is provided with a portion 243 which is threadably connected to the head 212. A set screw 244, which is mounted in the head 212, engages the threaded portion 243 for insuring the holding of the screw 234 in any set position. A collar 245 is provided on the screw 234 beyond the threaded portion 243. The diameter of the screw is reduced somewhat between the threaded portion and the collar 245. Beyond the collar 245 is a reduced portion of the screw which projects through the head 213 and a plate 246. The plate 246 is suitably secured to the slide 203 in the same manner as the plate 239 is secured to such slide. The opening in the head 213 through which the screw 234 passes is of such size as to permit the ready movement of the collar 245 therethrough. A spring member 247 is mounted on the screw 234 between the plate 246 and the collar 245. The spring member exerts a force on the screw 234 tending to move it towards the left, as shown in Fig. 6 of the drawings. Thus, from the above description, it is apparent the spring members 241 and 247 operating on the screws 233 and 234, respectively, tend to separate the grooving heads 212 and 213 carrying the milling cutters 225 and 214.

An adjusting bolt 248 projects through the slide 203 for supporting a head adjustor 249, as shown in Figs. 6 and 7 of the drawings. The head adjustor 249 is secured to the adjusting bolt 248 by means of a screw 250. One end of the head adjustor is provided with a bifurcated portion with fits the portion 237 of the screw 233 adjacent to the collar 236. The other end of the head adjustor 249 is provided with a bifurcated portion which fits that portion of the screw 234 which is located between the collar 245 and the threaded portion 243. With the head adjustor so mounted, it is apparent the movement thereof in the counter-clockwise direction would tend to bring the two milling cutters together, whereas a movement thereof in a clockwise direction would tend to separate the two milling cutters.

A lever 251, which is pinned to a shaft 252, is provided with a bolt 253 in the end thereof, as shown in Fig. 2 of the drawings. The bolt in the end of the lever 251 is adapted to engage the end of the screw 233 when the grooving heads 212 and 213 have been moved towards the left, as shown in Fig. 2 of the drawings, to place the cutters 225 and 214 in position to engage a blank in the turret. The shaft 252 has a bearing in a bracket 254 which is secured to the side of the main frame 9. A second lever 255 is pinned to the shaft 252. The two levers 251 and 255, which are pinned to the shaft 252 on opposite sides of the bearing in the bracket 254, serve to prevent any longitudinal movement of such shaft. A bolt 256, which carries a roller 257, is secured to the lever 255 near the end thereof. The roller 257 is fitted to a cam groove 258 in the end of a cam drum 259. The cam drum 259 is fixedly mounted on the cam shaft 29 and accordingly effects operation of the levers 255 and 251 in timed relation to the indexing operation and the operations at the various stations of the machine.

Assuming the cutters 225 and 214 have been moved forward by the cam groove 210 operating on the stud 207 in the adjusting head slide 203, the screw 233 is in position to be engaged by the bolt 253 in the end of the lever 251. The movement of the lever 251 by the cam groove 258 forces the screw 233 towards the left, as shown in Fig. 6 of the drawings. Such movement of the screw 233 towards the left gives the head adjusting member 249 a movement of rotation in a counter-clockwise direction. The clockwise movement of the head adjusting member moves the grooving heads 212 and 213 toward each other so that the cutters 225 and 214 are moved into engagement with a blank in the turret. When the lever 251 disengages the end of the screw 233, the spring members 241 and 247 move the milling cutters 225 and 214 away from the blank being operated on in the turret. The lever 251 is moved out of engagement with the screw 233 prior to the movement of the milling cutters 225 and 214 away from the turret.

A power shaft 260, which carries a pulley 261 on the end thereof, is provided for supplying power to rotate the two milling cutters. The shaft 260 is provided with suitable bearings in the chamfering head base members 262 and 263. The base members 262 and 263 are directly mounted on the frame 9 of the machine and preferably are bolted thereto. An elongated gear wheel 264 is splined to the shaft 260 between two walls 265 and 266 which project from the base member 263. The gear wheel 264 is connected to a set of gear wheels 267 to 273, inclusive, which are respectively mounted on shafts 274 to 280, inclusive. The shafts 274 to 280, inclusive, are provided with bearings in ribs 281 and 282 which project from a drilling and counterboring head 283.

The head 283 is constructed and operated in a manner to be hereinafter set forth for drilling and counterboring half of the holes 5 and 7 in the blanks. The head 283 is reciprocated during the operation of the machine and the gear wheel 264 is of such a length as to always be in mesh with the gear wheel 267. The shaft 280, which carries the gear wheel 273, carries a second gear wheel 284 near the end thereof. The gear wheel 284 meshes with an elongated gear wheel 285 which is provided with bearings in a bracket 286. The bracket 286 is secured to the side of the main frame 9, as shown in Figs. 2 and 3 of the drawings. The gear wheel 285 is of such length that the gear wheel 284 is maintained in mesh with it notwithstanding the movement of the head 283. A gear wheel 287, which is mounted on a shaft 288, meshes with the gear wheel 285. The shaft 288 carries a second gear wheel 289 which meshes with a gear wheel 290 on a shaft 291. The shafts 288 and 291 are provided with bearings in a bracket 292 which is secured to the end of the main frame 9 as shown in Figs. 2 and 3 of the drawings. The shafts 291 and 288 are respectively connected to the milling cutters spindles 227 and 216 by means of suitable flexible shafts.

The flexible shafts are so constructed as not to interfere with the movement of the grooving heads on the slide 203 or the movement of the slide 203 on the plate 201. The two shafts are similar in construction and a detailed description of both shafts is deemed unnecessary. The flexible shaft, which connects the cutter spindle 227 to the shaft 291, is shown in Fig. 1 of the drawings. Such flexible shaft comprises two suitable universal joints 293 and 294 which are respectively connected to the shaft 291 and the cutter spindle 227. The universal joint 293 is pinned to a short shaft 295 which in turn is splined to a sleeve 296. The sleeve 296 is pinned to a short shaft 297 which in turn is pinned to the universal joint 294. The splined connection between the short shaft 295 and the sleeve 296 permits longitudinal movement of the cutter 225 relative to the shaft 291. The universal joints permit the free movement of the grooving heads on the slide 203 and the movement of the slide 203 on the plate 202. Such flexible shafts are well known and a further description thereof is deemed unnecessary.

At station D, as heretofore set forth, two operations are performed, namely, the drilling of the soles 5 in a blank and the cutting of a slot 4 in the side of the blank. The drilling and slotting operations are simultaneously performed and are each controlled in accordance with the rotation of the cam shaft 29.

The slotting slide 298 is fitted to a guideway 299 in the frame 9 of the machine, as shown in Figs. 2 and 5 of the drawings. The slide 298 is held in the guideway 299 by means of straps 300 which are screwed to the main frame of the machine. The strap members 300 engage shoulder portions of the slide, as shown in Fig. 5 of the drawings. The slide 298 is provided with a guideway 301 upon which is mounted a slotting head 302. A gib member 303 is operated by a bolt 304 to lock the head on the slide in any set position, as shown in Figs. 8 and 9 of the drawings. The head 302 is adjusted on the slide 298 by means of an adjusting screw 305. The screw 305 is provided with a threaded portion 306 which engages a suitable bronze nut 307. The bronze nut is secured in any suitable manner in the head 302, as shown in Fig. 5 of the drawings. A collar portion 308 is formed adjacent to the threaded portion 306. The collar 308 abuts a bracket 309 which is bolted to the slide 298, as shown in Figs. 5, 8 and 9 of the drawings. A second collar 310 is pinned to the shaft on the opposite side of the bracket 309. In the above construction it is apparent that the rotation of the screw member 305 serves to adjust the position of the head 302 on the slide 298. Preferably, a scale is carried by the collar portion 308.

A spindle 311, which carries an end milling cutter 312, is mounted in bearings 313 and 314 on the head 302. A washer 315 and a nut 316 are fastened to the spindle 311 on one side of the bearing 313 and a washer 317 is pinned to the spindle on the opposite side of the bearing 313 to prevent any longitudinal movement of the spindle and cutter in the head 302. A spiral gear wheel 318 is splined to the spindle 311 between the two bearings 313 and 314. The spiral gear wheel 318 meshes with a spiral pinion 319 which is fixedly connected to a constantly rotating power shaft 320.

A stud shaft 321 having a grooved portion 322 therein is fastened to the end of the slide 298, as shown in Figs. 2, 5, 8 and 9 of the drawings. The grooved portion in the stud shaft is engaged by two rollers 323 which are secured in the bifurcated end portion of a lever 324. The lever 324 is pivotally mounted on the main frame 9 by means of a bolt 325. The opposite end of the lever carries a bolt 326 which has a roller member 327 mounted on it. The roller 327 is fitted to a cam groove 328 which is formed on the surface of the cam drum 211. The cam groove serves to so operate the lever 324 as to reciprocate the slide 298 on the main frame 9. Such a movement of the slide causes the end milling cutter 312 to cut a slot in the side of the blank which is then located at station D.

The spiral pinion 319 is secured to the shaft 320 on one side of the bearing in the slide 298 and a collar member 329 is pinned to the shaft on the other side of the bearing in order to prevent any longitudinal movement of the shaft. The shaft 320 is connected to a sleeve member 330 by suitable key members in order to permit longitudinal movement of the shaft 320 relative to the sleeve member while rotating therewith, as shown in Fig. 2 of the drawings. The sleeve member 330 is pinned to a short shaft 331 which carries a gear wheel 332. The shaft 320 and the sleeve 330 project through a bracket 333 which is secured to the side of the main frame, as shown in Fig. 2 of the drawings. The bracket 333 supports a lever 334 for a purpose to be hereinafter set forth. The gear wheel 332 meshes with a gear wheel 335 that is supported on a stud bolt 336, as shown in Figs. 2 and 29 of the drawings. The gear wheel 335 meshes with a gear wheel 337 which is keyed to a shaft 338. A second elongated gear wheel 339 is also keyed to the shaft 338. The shafts 331 and 338 and the stud bolt 336 are provided with bearings in a bracket 340 which is secured to the main frame 9 of the machine, as shown in Figs. 2, 4 and 29 of the drawings. The elongated gear wheel 339 meshes with a gear wheel 341 which is pinned to a shaft 342. The shaft 342 carries a second gear wheel 343 which is connected to an elongated gear wheel 344 by means of gear wheels 345 to 350, inclusive. The gear wheels 345 to 350, inclusive, are respectively mounted on shafts 351 to 356, inclusive, which are mounted on a drilling and counterboring head 357.

The elongated gear wheel 344 is mounted in the chamfering head base 262 and is connected through a gear wheel 358 to a gear wheel 359 which is mounted on the power shaft 260. In the above manner the end milling cutter 312 is constantly rotated from the power shaft 260 for cutting the slot 4 in the side of a blank.

The drilling and chamfering head 283 is slidably mounted on a guideway 360 which is formed on the main frame 9 of the machine, as shown in Fig. 5 of the drawings. The head 283 carries drilling and chamfering tools for drilling holes at the stations D and E and for chamfering holes in the blank at stations F and G from one side of the turret 10. The head is reciprocated on the slide by means of a lever arm 361 which is pivotally supported by a pin 362 on a bracket 363. The bracket 363 is fastened to the main frame 9, as shown in Fig. 2 of the drawings. A bolt 364, which carries a roller 365, is mounted near one end of the lever 361. The roller 365 is fitted to a cam groove 366 that is formed on the surface of the cam drum 259. A bolt 367, which is secured to the opposite end of the lever 361, carries a block 368. The block operates in a shoe plate 369 which is secured to the drilling and chamfering head 283, as shown in Fig. 2 of the drawings. Thus, the head 283 is reciprocated by the cam groove 366 in accordance with the rotation of the cam shaft 29.

The head 283 is provided with a projecting rib 379 for supporting the various drilling and counterboring tools to be hereinafter described and the two projecting ribs 281 and 282 which support the gear wheels 267 and 273, inclusive. The shaft 274, which carries the gear wheel 267, is connected by a flexible shaft 380 to a counterboring head 381. The shaft 276, which carries the gear wheel 269, is connected to a counter-boring head 382 by a flexible shaft 383. The shaft 278, which carries the gear wheel 271, is connected to a drilling head 384 by means of a flexible shaft 385. The shaft 280, which carries the gear wheel 273, is connected to a drilling head 386 by means of a flexible shaft 387. Inasmuch as the drilling heads 281, 382, 384 and 386 and the flexible shafts 380, 383, 385 and 387 are similar in construction, a detailed description of only one head and one flexible shaft will be given. It is to be understood, however, that the various heads are adapted to carry different tools. The drilling heads 384 and 386 carry drills for operating at stations E and D whereas the counterboring heads 381 and 382 carry counterboring tools for operating at stations G and F. The gear wheels 268, 270 and 272, which are supported by shafts 275, 277 and 279 in the ribs 281 and 282, are idler gear wheels for connecting the gear wheels 267, 269, 271 and 273 to the elongated gear wheel 264 on the power shaft 260.

Referring to Fig. 2 and particularly to Figs. 21, 22 and 23, a detailed description of the drilling head 386 and the flexible shaft 387 connected thereto will be given. A plate 388 is secured to the projecting rib 379 by means of screws 389. The position of the plate 388 is adjusted in accordance with the particular station at which the plate is located. Thus, at station D, the plate must be so positioned that the axis of rotation of the drilling tool may be adjusted in line with the holes 5 to be drilled in the blank. At station E the plate must be so positioned that the axis of rotation of the drilling tool may be adjusted in line with the holes 7 to be drilled in the blank. At station F the plate is so placed that the axis of rotation of the counterboring tool may be adjusted in line with the two drilled holes 5 and at station G the plate is so placed as to permit adjustment of the axis of rotation of the counterboring tool in line with the drilled holes 7.

In Fig. 2 the various drilling and counterboring heads have not been shown in exact position for convenience in illustrating. The placing of the various heads in their exact position would confuse rather than clarify the drawings.

A bearing 390, which projects through the plate 388, is supported by means of two screw plates 391 and an adjusting screw 392. The screw plates 391 are secured to the top of the plate 388. The adjusting screw 392 is provided with a collar portion which is disposed between the plates, as shown in Fig. 21 of the drawings. The screw 392 is threadably connected to the bearing 390 and accordingly rotation of the screw serves to adjust the position of the bearing in the plate. A bolt 393, which projects through a slot 394 in the bearing 390, is connected to the plate 388. The bolt 393 serves to hold the bearing in any adjusted position.

Two bushings 395 and 396, which are located within the bearing 390, carry a spindle 397. The spindle 397 is provided with washers 398 and 399 which are respectively fastened to it adjacent to the bushings 395 and 396. A shoulder portion 400 is formed on the spindle adjacent to the washer 398 and a removing nut is connected to the spindle adjacent to the shoulder portion. A suitable chuck 401 is connected to a tapered portion of the spindle adjacent to the removing nut. The chuck 401 carries a suitable drilling tool. The spindle 397 is prevented from having longitudinal movement in the bearing 390 by means of a nut 402 which is located adjacent to the washer 399. In the above construction it is apparent, operation of the screw 392 serves to adjust the position of the tool carried by the chuck 401. The tool, as heretofore set forth, is adjusted in line with the holes 5 to be drilled in the blank. Such adjustment is essential when blanks of different sizes are to be operated on.

The flexible shaft 387 is provided with two suitable universal joints 403 and 404 which are respectively connected to the shaft 280 and the spindle 397. The universal joint 404 is pinned to a shaft 405. The universal joint 403 is pinned to a sleeve 406. The sleeve 406 and the shaft 405 are suitably keyed together in order that they may have a longitudinal movement relative to each other. It is apparent the drilling head 386 may be adjusted relative to the axis of rotation of the shaft 280 without in any way interfering with the transmission of power to the drilling head.

A guide bushing bracket 407, which carries a bushing plate 408, is mounted on the main frame of the machine adjacent to the turret 10 as shown in Figs. 2 and 24 of the drawings. The plate 408, which is secured to arms 409 on the bracket, carries a set of bushings 410. Each of the bushings, as shown in Figs. 24, 26 and 27, is provided with one hole therein. Such hole serves as a guide for the tool which is mounted in alignment with the bushing. The bushing is held in set position by a clamping member 411 which is screwed to the plate 408. One bushing 410 is aligned with each of the heads 381, 382, 384 and 386. The various bushings are so adjusted that the hole therethrough is aligned with the hole which is to be drilled or counterbored in the blank adjacent thereto. Thus, the bushings serve as an accurate guide for the tools carried by the drilling and counterboring heads.

The lever 334, which operates the drilling and chamfering head 357, is pivotally mounted on the bracket 333 by means of a pin 412. A bolt 413, which is fastened near the end of the lever 334, carries a roller similar to the roller 365 which is carried by the lever 361. The roller on the end of the bolt 413 is fitted to a cam groove 414. The cam groove 414 is formed on the surface of the cam drum 142, as shown in Fig. 2 of the drawings. A shoe plate 415 is secured to the head 357. A block 416, which is mounted on a bolt 417, is adapted to operate in a groove formed in the shoe plate. The bolt 417 is secured to the end of the lever 334. Thus, the head 357 is operated by the cam groove 414 in the same manner as the head 283 is operated by the cam groove 366.

The head 357 is provided with two projecting rib portions 418 and 419, which carry the shafts 342, 351, 352, 353, 354, 355 and 356. The shafts, as heretofore set forth, carry gear wheels 343, 345, 346, 347, 348, 349 and 350 for supplying power not only to various drilling and counterboring stations but also to the slotting tool at station D. The shaft 342, which carries the gear wheel 343, is connected to a drilling head 420 by means of a flexible shaft 421, as shown in Fig. 2 of the drawings. The shaft 352, which carries the gear wheel 346, is connected to a drilling head 422 by means of a flexible shaft 423. The shaft 354, which carries the gear wheel 348, is connected to a counterboring head 424 by means of a flexible shaft 425. The shaft 355, which carries the gear wheel 349, is connected to a counterboring head 426 by means of a flexible shaft 427. The various flexible shafts and the heads connected thereto are similar in construction and operation to the flexible shaft and head already described and a detailed description of each shaft and head is deemed unnecessary.

A guide bushing plate 428, which is similar in construction to the guide bushing plate 407, is secured to the main frame 9 adjacent to the turret 10 for guiding the tools carried by the heads 420, 422, 424 and 426. The guide bushing plate 428 carries a bushing plate 429 which is similar in construction to the plate 408 already described.

After an indexing operation of the machine has taken place, the two heads 283 and 357 are moved towards each other so that two holes 5, as shown in Fig. 5 of the drawings, are drilled through a blank at station D, two holes 7 are drilled through a blank at station E, two holes 5 are counterbored at station F and two holes 7 are counterbored at station G.

At the chamfering station G means are provided for relieving the cutting edges on a blank adjacent to each side of the blank. The chamfering means, which are located on the respective sides of the turret, are similar in construction and operation and accordingly a detailed description of only one of such chamfering means is deemed necessary. The two sets of chamfering means vary only in the gearing connections to the power shaft 260. A detailed description will be given of the chamfering means shown to the left of Fig. 1 and to the right of Fig. 2. Detailed views of the chamfering means are shown in Figs. 31 to 38, inclusive.

The chamfering head base 263 is provided with a projecting portion 430 which is fitted to a groove in the main frame 9 of the machine, as shown in Fig. 5 of the drawings. The head base is also fixedly bolted to the main frame. A slide plate 431 is fitted to a guideway 432 in the head base 263. A slot 433, which is formed in the slide plate 431, is fitted to the end of a lever 434. The lever 434 is pivotally supported by a bolt 435 on the main frame of the machine and projects through an opening 436 in the top of the main frame 9.

The lever 434 is provided with a bifurcated end portion which is pivotally connected to a lever link 437. The lever link 437 is pivotally connected to a bifurcated end portion of a chamfering lever 438. The chamfering lever 438 is pivotally supported on the main frame 9 by a bolt 439. A stud bolt 440, which is mounted near the end of the chamfering lever 438, carries a roller which is fitted to a cam groove 441. The cam groove 441 is formed on the surface of the cam drum 259. The cam groove 441 serves to reciprocate the slide plate 431 in timed relation to the rotation of the cam shaft 29.

The slide plate 431 is provided with a guide 442 which is fitted to a guideway formed in a chamfering head 443. A gib member 444, which is operated by set screws 445, is provided for clamping the head 443 in any set position upon the slide plate 431, as shown in Fig. 30 of the drawings. A plate 446, which is bolted to the end of the slide plate 431, as shown in Fig. 30 of the drawings, carries a bolt 447 which serves to adjust the position of the head 443 on the guide plate. The bolt 447 is threadably connected to the head 443 and is rotatably mounted in the plate 446. Collar members are attached to the bolt on each side of the plate 446 to prevent any longitudinal movement of the bolt through the plate.

A chamfering sleeve 448 is rotatably mounted in the head 443. A cap member 449 is provided for holding the sleeve 448 in position. A collar portion 450 is formed on one end of the sleeve 448 and a washer 451 is pinned to the collar portion adjacent to the bearing of the sleeve in the head 443. A washer 452 is pinned to a reduced threaded portion 453 of the sleeve on the opposite side of the bearing. A nut 454 is fastened to the sleeve adjacent to the washer 452. The washers and the nut 454 serve to prevent any axial movement of the sleeve 448 in the head 443. The opposite end of the sleeve 448 is supported in the projecting wall 265 of the chamfering head base 262.

A spindle chuck 456 is threadably connected to the end of the sleeve 448, as shown in Fig. 31 of the drawings. The chuck 456 is provided with a guideway 457 in which is slidably mounted an adjusting ring 458. Two plates 459, which are bolted to the top of the spindle chuck 456, support an adjusting screw 460. The adjusting screw 460 is provided with a collar portion which is disposed between the two plates 459 in order to prevent any longitudinal movement of the screw. The screw is threadably connected to the adjusting ring 458 and serves to move the ring in the guideway 457. A bolt 461, which projects through a slot 462 in the adjusting ring 458, is threadably connected to the spindle chuck 456. The bolt serves to hold the adjusting ring 458 in any set position.

A bushing ring 463, which is mounted on the adjusting ring 458, is provided with a shoulder portion 464. The shoulder portion 464 is adjustable in a guideway 465 formed in the adjusting ring 458. A nut 466, which is threadably connected to the bushing ring 463 adjacent to the spindle chuck 456, serves to prevent any longitudinal movement of the bushing ring in the spindle chuck 456 and the adjusting ring 458. Two plates 467, which are bolted to the bushing ring 458, carry an adjusting bolt 468, as shown in Fig. 32 of the drawings. The bolt 468 is provided with a collar portion which is disposed between the two plates in order to prevent any longitudinal movement of the bolt. The bolt is threadably connected to the bushing ring 463 and serves to adjust such ring in the guideway 465 formed in the adjusting ring 458. A bolt 469ª passes through a slot 469 in the shoulder portion of the bushing ring and is threadably connected to the adjusting ring 458. The bolt 469ª serves to hold the bushing ring in any adjusted position. A chuck shaft 470 is rotatably mounted in end bushings 471 which are mounted in the bushing ring 464. A washer 472, which is pinned to the chuck shaft, engages a shoulder portion on the shaft adjacent to one of the end bushings 471. The washer and shoulder portion of the shaft serve to prevent longitudinal movement of the chuck shaft in one direction. A nut 473, which is connected to the opposite end of the chuck shaft, engages the other end bushing 471 to prevent longitudinal movement of the chuck shaft in an opposite direction. A suitable chuck 474 is mounted on the end of the chuck shaft for carrying the chamfering tool.

In the above construction it is apparent the axis of rotation of the chuck shaft 470 may be adjusted by the screws 460 and 468 to any desired position relative to the axis of rotation of the sleeve 448. The axis of rotation of the chuck shaft is adjusted in order to correctly relieve the cutting edges on the blank adjacent to an outside surface thereof.

Figure 38:
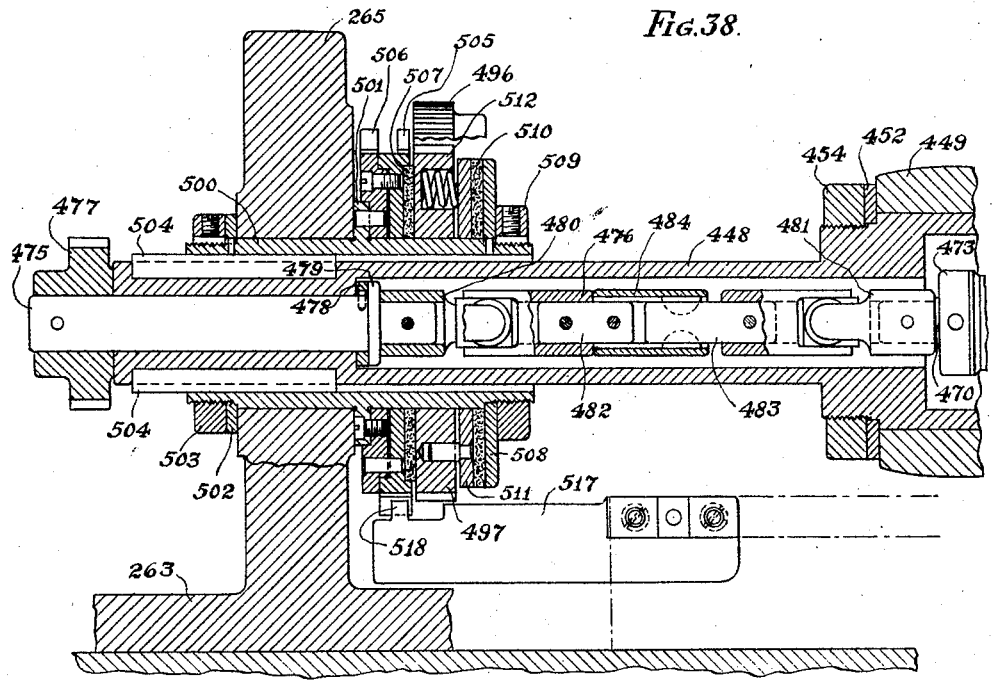
Fig. 38 is a sectional view of the mechanism connected to the chamfering indexing plates.

A drive shaft 475, which is rotatably mounted in the end of the sleeve 448, is connected to the chuck shaft 470 by means of a flexible shaft 476. A pinion 477, which is pinned to the drive shaft 475 adjacent to the end of the sleeve 448, prevents longitudinal movement of the drive shaft towards the right, as shown in Fig. 38 of the drawings. A washer 478 is pinned to the drive shaft adjacent to a collar portion 479. The collar portion 479 and the washer 478 engage a shoulder in the sleeve 448 and prevent longitudinal movement of the shaft 475 towards the left, as shown in Fig. 38 of the drawings.

The flexible shaft 476 is disposed within the sleeve 448 and comprises two universal joints 480 and 481 which are respectively connected to the end of the drive shaft 475 and the end of the chuck shaft 470. The universal joint 480 is pinned to a short shaft 482 and the universal joint 481 is pinned to a short shaft 483. The shaft 482 is pinned to a sleeve member 484 and the shaft 483 is connected to the sleeve member 484 by suitable key members. The connection between the shaft 483 and the sleeve 484 permits the shaft 483 to effect longitudinal movement relative to the sleeve while rotating therewith. By means of such flexible shaft, it is apparent the axis of rotation of the chamfering tool may be moved relative to the axis of rotation of the sleeve 448 without interfering with the transmission of power from the drive shaft 475 to the chamfering tool.

Figure 40:
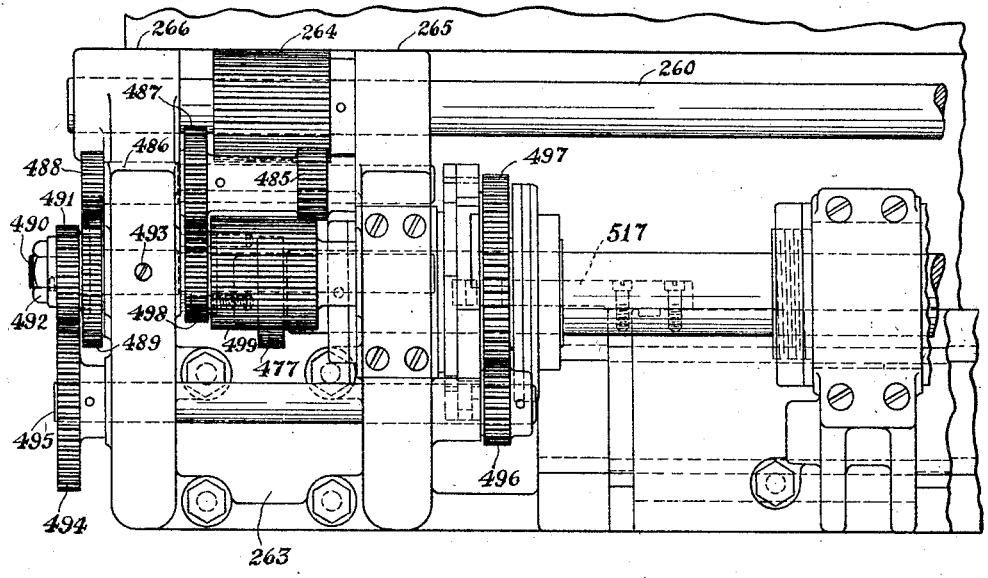
Fig. 40 is a plan view of the gearing connected to the chamfering head shown to the left of Fig. 1.
Figure 41:
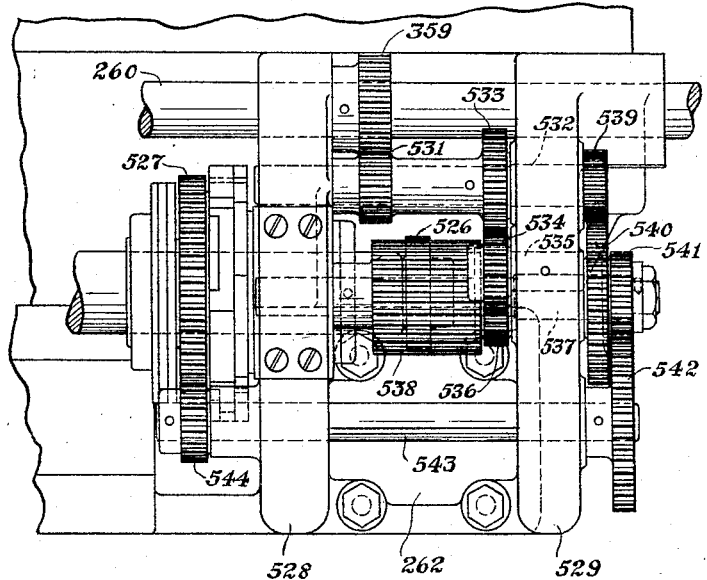
Fig. 41 is a plan view of the gearing connected to the chamfering head shown to the right of Fig. 1.

The projecting walls 266 and 265 from the chamfering head base 263 support one end of the power shaft 260. The elongated gear wheel 264, as heretofore set forth, is fixedly mounted on the power shaft between the two walls 265 and 266. The elongated gear wheel 264 not only meshes with gear wheel 267 but also meshes with a gear wheel 485 which is fixedly mounted on a short shaft 486. The shaft 486 is provided with bearings in the walls 265 and 266. The shaft 486 carries a second gear wheel 487 which is preferably formed integral with the gear wheel 485. A third gear wheel 488 is fixedly mounted on the shaft 486 outside the wall 266. The gear wheel 488 meshes with a gear wheel 489 which is rotatably mounted on a shaft 490. A second gear wheel 491 is fixedly connected to the gear wheel 489 and is held in position on the shaft 490 by means of a nut 492, as shown in Fig. 40 of the drawings. The shaft 490 is supported in the walls 265 and 266 and is preferably held against rotation by means of a set screw 493. The gear wheels 489 and 491 are rotatably mounted on the shaft 490 and the gear wheel 491 meshes with a gear wheel 494 which is pinned to a shaft 495. The shaft 495 is provided with bearings in the walls 265 and 266 and carries a pinion 496 near the opposite end thereof. The pinion 496 is keyed to the shaft and meshes with a gear wheel 497 for indexing the sleeve 448 in a manner to be hereinafter set forth. The gear wheel 487, which is fixedly mounted on the shaft 486, meshes with a gear wheel 498 on the shaft 490. The gear wheel 498 is fixedly connected to an elongated gear wheel 499. The gear wheels 498 and 499 are rotatably mounted on the shaft 490 and the elongated gear wheel meshes with the pinion 477 which is mounted on the ends of the drive shaft 475, as shown in Figs. 1 and 38 of the drawings. By such means the drive shaft 475 is constantly rotated from the power shaft 260 for rotating the chamfering tool which is carried by the chamfering head.

The gear wheel 497, which is rotated by the pinion 496, serves to operate the means for indexing the sleeve 448. The gear wheel 497 is rotatably mounted on a sleeve member 500. The sleeve member 500 is rotatably supported in the wall 265 and is provided with a collar portion 501 adjacent to one side of the wall. A washer 502 and a nut 503 are secured to the sleeve 500 adjacent to the other side of the wall. The sleeve 500 is connected by key members 504 to the sleeve 448 which extends through the chamfering head. The sleeve 448 is slidably mounted in the sleeve 500 but is caused to rotate therewith by means of the key connection thereto.

Two indexing plates 505 and 506 are mounted on the sleeve 500 between the collar portion 501 of the sleeve and the gear wheel 497. The plate 506 is preferably fixedly secured to the collar portion 501. The plate 505 is secured to the plate 506 in a set relation for a purpose to be hereinafter set forth. If so desired, the plates 505 and 506 may be formed integrally. A friction disk 507, which is preferably composed of leather is secured to the plate 505 and is adapted to engage the gear wheel 497, as shown in Fig. 38 of the drawings. A ring 508 is pinned to the sleeve 500 between a shoulder portion, which is formed on the sleeve, and a nut 509 which is secured to the end of the sleeve. A friction disk 510, which is preferably composed of leather, is disposed adjacent to the ring 508 and a disk 511 is disposed between the leather disk 510 and the gear wheel 497. The disk 511 is slidably mounted on the sleeve 500 but is pinned in any suitable manner to the gear wheel 497 in order to rotate therewith. Spring members 512 are disposed between the disk 511 and the gear wheel 497 in order to hold the disk 511 and the disk 510 in frictional engagement with the ring 508.

The indexing plate 505 is provided with four radial projections 513 which have a width equal to the width of the plate. Between the projections 513 are disposed projections 514 which do not have a width equal to the width of the plate. The projections 513 and 514 are separated by grooves 515 for a purpose to be hereinafter set forth.

The plate 506 is provided with four radial and symmetrically placed projections 516. The projections 516 are preferably the same size as the projections 514 on the disk 505 and the plates 505 and 506 are so joined together that the projections 516 and 514 are disposed opposite each other, as shown in Fig. 37 of the drawings.

A disk key 517, which is bolted to the end of the slide plate 431, carries a projection or lug 518 which is adapted to operate in the notches and grooves formed by the projections on the assembled plates 505 and 506. The projection 518 is of such a thickness that it fits between the projections 514 and 513 on the plate 505. The width of the projections 518 is determined so that the projection freely passes in the groove formed between the projections 516 and 514 on the assembled plates.

Assuming the gear wheel 497 to be operating in a clockwise direction, as viewed from the right of Fig. 38, the assembled plates 505 and 506 will be subjected to a force tending to rotate them in a clockwise direction. The developed view of the assembled plates, as shown in Fig. 37 of the drawings, will tend to move towards the right as indicated by the arrow. When the chamfering operation is being effected by the chamfering tool carried by the chuck 474, the projection 518 on the disk key or latch member 517 is in a position between two of the projections 513 and 514 on the indexing plate 505. If the plates 505 and 506 remain stationary in the developed view shown in Fig. 37, the path of movement of the projection 518 is indicated by the dotted arrow line. The movement of the slide plate 431 by the lever 434 to withdraw the chamfering tool from engagement with a blank causes the projection 518 to move from between the projections 513 and 514 on the indexing plate 505 to a position in the path of movement of one of the projections 516 on the indexing plate 506. In such position of the projection on the disk key, the indexing plates will rotate until the projection 518 encounters one of the projections 516, as shown in Fig. 37 of the drawings. At such time the chamfering tool has been withdrawn from the blank and a return movement is started. It will be noted that the plates 505 and 506, as well as the sleeve 448, which carries the chamfering tool, have been indexed through ⅛ of a revolution. During the movement of the chamfering tool towards the blank, the projection 518 on the disk key is moved out of engagement with the projection 516 on the indexing plate 506 and at such time the two indexing plates effect a further movement of rotation until the projection 518 encounters one of the projections 513. Further movement of the projection 518 locks it between one of the projections 513 and one of the projections 514. In the above construction, it will be noted the reciprocating movement of the slide plate 431 not only moves the chamfering tool into and out of engagement with the blank positioned at station H but also so operates the disk key 517 as to index the chamfering tool through a quarter turn with respect to the blank. As heretofore set forth, the axis of the chamfering tool is eccentrically mounted with respect to the axis of the sleeve 448 which is indexed by the plates 505 and 506. The eccentric mounting of the axis of the chamfering tool is varied as heretofore set forth by adjusting the screws 460 and 468.

The chamfering mechanism, shown to the right of the turret as viewed in Fig. 1, is similar in construction and operation to the chamfering mechanism above described. The chamfering mechanism located on the right of the turret is operated by a lever 519 which is pivotally supported by a bolt 520 on the main frame 9. The lever 519 is provided with a bifurcated end portion that is pivotally connected to a lever link 521. The lever link 521 is pivotally connected to a chamfering lever 522 which is pivotally mounted on the main frame 9 by means of a bolt 523. The chamfering lever 522 carries a bolt 524 near the end thereof. The bolt 524 carries a roller which is fitted to a cam groove 525 formed on the cam drum 142. Thus, the cam groove 525 operates the lever 519 to reciprocate the chamfering tool shown to the right of the turret and also to index said chamfering tool to relieve the various cutting edges of each blank.

A drive shaft on the chamfering mechanism shown to the right of the turret in Fig. 1 of the drawings, carries a gear wheel 526 and the chamfering mechanism carries a gear wheel 527.

The power shaft 260 is provided with bearings in two walls 528 and 529 which project from the chamfering head base member 262. The gear wheel 359, which is pinned to the shaft 260 adjacent to the wall 528, meshes with a pinion 531 which is mounted on a shaft 532. The shaft 532 is rotatably supported in the two walls 528 and 529. A second gear wheel 533, which is either fixedly connected to the gear wheel 531 or formed integral therewith, meshes with a gear wheel 534 that is mounted on a stud shaft 535. The shaft 535 is supported in the wall 529. The gear wheel 534 meshes with a gear wheel 536 which is mounted on a shaft 537. The shaft 537 is supported in the walls 529 and 528. A gear wheel 538 is fixedly connected to the gear wheel 536. The gear wheel 538 meshes with the gear wheel 526 which is mounted on the driving shaft connected to the chamfering tool located to the right of the turret in Fig. 1 of the drawings. The gear wheels 538 and 536 are rotatably mounted on the shaft 537.

A gear wheel 539, which is fixedly mounted on the end of the shaft 532, meshes with a gear wheel 540 which is rotatably mounted on the shaft 537. The gear wheel 540 is fixedly connected to a gear wheel 541. The gear wheel 541 meshes with a gear wheel 542 which is fixedly mounted on a shaft 543. The shaft 543 is rotatably mounted in the walls 528 and 529 and carries a pinion 544 adjacent to the wall 528. The pinion 544 meshes with the gear wheel 527 which operates the chamfering indexing mechanism located at the right of the turret. The gear wheel 359, which is mounted on the power shaft, not only meshes with the gear wheel 531 for operating the chamfering mechanism but also meshes with a gear wheel 344 as heretofore set forth for operating the various drilling and counterboring heads which are located to the right of the turret as shown in Fig. 1 of the drawings.

Modifications in the machine and in the arrangement and location of parts may be made within the spirit and scope of my invention and such modifications are intended to be covered by the appended claims.

What I claim is:

1. In an automatic machine, the combination comprising a member adapted to carry a blank having a tapped hole in the center thereof, means for indexing said member to bring the blank into operative relation to a number of stations, and means located at the various stations for so cutting away portions of the tapped hole in the blank as to form cutting edges and for so chamfering the blank as to relieve the cutting edges adjacent to one side of the blank.

2. In an automatic machine, the combination comprising a member adapted to carry a blank having a tapped hole in the center thereof, means for indexing said member to bring the blank into operative relation to a number of stations, and means located at the various stations for so cutting away portions of the tapped hole in the blank as to form cutting edges, for stamping the blank, and for so chamfering the blank as to relieve the cutting edges adjacent to the top and bottom side of the blank.

3. In an automatic machine, the combination comprising a member adapted to carry a plurality of blanks, each of said blanks having a tapped hole in the center thereof, means for indexing said member to bring each blank into operative relation to a number of stations, and means located at the various stations for so cutting away side portions of the tapped hole in each blank as to form cutting edges.

4. In an automatic machine, the combination comprising a member adapted to carry a plurality of blanks, each of said blanks having a tapped hole in the center thereof, means for indexing said member to bring each blank into operative relation to a number of stations, and means located at the various stations for so cutting away portions of the tapped hole in each blank as to form cutting edges, for stamping each blank, and for so chamfering each blank as to relieve the cutting edges adjacent to the top and bottom side of each blank.

5. In an automatic machine, the combination comprising a member adapted to carry a plurality of blanks, each of said blanks having a tapped hole in the center thereof, means for indexing said member to bring each blank into operative relation to a number of stations, and means located at the various stations for so cutting away portions of the tapped hole in each blank as to form cutting edges and for so chamfering each blank as to relieve the cutting edges adjacent to one side of the blank.

6. In an automatic machine, the combination comprising a member adapted to carry a plurality of blanks, each of said blanks having a tapped hole in the center thereof, means for indexing said member to bring each blank into operative relation to a number of stations, and means located at said stations for forming holes in each blank, said holes extending into the tapped hole to form cutting edges, and for so chamfering each blank as to relieve said cutting edges adjacent to one side of each blank.

7. In a machine, the combination with a member adapted to carry a plurality of blanks each of said blanks having a tapped hole in the center thereof, of means successively operating on the blanks for forming holes therein, said holes extending into the tapped hole in the center of each blank to form cutting edges, and means for relieving the cutting edges adjacent the top and bottom surfaces of each blank by a chamfering operation.

8. In a machine, the combination with a member adapted to carry a plurality of blanks, each of said blanks having a tapped hole in the center thereof, of means successively operating on the blanks for forming holes therein, said holes extending in each blank into the tapped hole to form cutting edges, and means for stamping each blank and for relieving the cutting edges adjacent the top and the bottom surface of each blank by a chamfering operation.

9. In a machine, the combination with a member adapted to carry a plurality of blanks, each of said blanks having a tapped hole in the center thereof, of means for operating on each of said blanks to drill and counterbore holes therethrough, said holes in each blank extending into the tapped hole to form cutting edges, and means for relieving the cutting edges adjacent the top and the bottom surface of each blank by a chamfering operation.

10. In a machine, the combination with a turret adapted to carry a plurality of blanks, each of said blanks having a tapped hole in the center thereof, and means for indexing the turret to bring each blank successively into operative relation to a number of stations, of means at the various stations for stamping the blanks and for drilling and counterboring holes therethrough, the sides of said holes extending into the tapped hole in the center of each blank to form cutting edges, and means at another station for relieving the cutting edges adjacent the top and bottom surface of each blank.

11. In a machine, the combination with a member adapted to carry a plurality of blanks, each of said blanks having a tapped hole in the center thereof, of means successively operating on the blanks for forming holes therethrough, said holes extending into the tapped hole in the center of each blank to form cutting edges, and means for relieving the cutting edges adjacent one surface of each blank by a chamfering operation.

12. In a machine, the combination with a member adapted to carry a plurality of blanks, each of said blanks having a tapped hole in the center thereof, of means for successively operating on the blanks to form holes therein, said holes extending into the tapped hole in each blank to form cutting edges, means for stamping each blank, and means for relieving the cutting edges adjacent one surface of each blank by a chamfering operation.

13. In a machine, the combination with a member adapted to carry a plurality of blanks, each of said blanks having a tapped hole in the center thereof, of means for operating on each of said blanks to drill and counterbore holes therethrough, said holes extending into the tapped hole to form cutting edges, and means for relieving the cutting edges adjacent one surface of each blank by a chamfering operation.

14. In a machine, the combination with a turret adapted to carry a plurality of blanks, each of said blanks having a tapped hole in the center thereof, and means for indexing the turret to bring each blank successively into operative relation to a number of stations, of means at various stations for drilling and counterboring holes in each blank, the said holes extending into the tapped hole in the center of each blank to form cutting edges; and means at one station for relieving the cutting edges adjacent one surface of each blank by a chamfering operation.

15. In a machine, the combination with the turret adapted to carry a plurality of blanks, each of said blanks having a tapped hole in the center thereof, and means for indexing the turret to bring each blank succesively into operative relation to a number of stations, of means at various stations for stamping said blanks, for drilling and counterboring holes through the blanks, said holes extending in each blank into the tapped hole in the center thereof to form cutting edges, and for relieving the cutting edges adjacent an outside surface of each blank by a chamfering operation.

16. In a machine, the combination with a turret adapted to carry a plurality of blanks, each of said blanks having a tapped hole in the center thereof, and means for indexing the turret to bring each blank successively into operative relation to a number of stations, of means at the various stations for drilling and counterboring holes through the blanks, the said holes extending into the tapped hole in the center of each blank to form cutting edges, and for relieving said cutting edges adjacent the top and bottom face of each blank by a chamfering operation, all of said operations being performed simultaneously on different blanks.

17. In a machine, the combination with a turret adapted to carry a plurality of blanks, each of said blanks having a hole through the center thereof, and means for indexing said turret to bring each blank successively into operative relation to a number of stations, of means at the various stations for stamping said blanks, for cutting grooves in blanks, for drilling holes in each blank while cutting a slot in the side of the blank, for so counterboring said drilled holes as to extend into the central hole of each blank to form cutting edges, and for chamfering the metal between each two drilled holes to relieve each cutting edge on both sides of the blank.

18. In a machine, the combination with a turret adapted to carry a plurality of blanks, each of said blanks having a tapped hole in the center thereof, and means for indexing said turret to bring each blank successively into operative relation to a number of stations, of means at the various stations for stamping said blanks, for cutting grooves in the blanks, for drilling holes in each blank adjacent to the tapped hole, for cutting a slot in the side of the blank, for counterboring said drilled hole to extend the drilled holes into the tapped hole in the center of the blank, and for so chamfering the metal between each two drilled holes as to relieve each cutting edge on both sides of the blank.

19. In an automatic machine, the combination comprising a member adapted to carry a plurality of blanks, each of said blanks having a tapped hole in the center thereof, means for so indexing said member as to bring each blank into operative relation to a number of stations, two of said stations serving as loading and unloading stations, means at one station for drilling two holes through the blank, means at another station for drilling two additional holes through each blank, means at two other stations for counterboring said four drilled holes into the tapped hole in the blank to form cutting edges, and means at another station for so chamfering each blank as to relieve said cutting edges adjacent to one side of each blank.

20. In an automatic machine, the combination comprising a member adapted to carry a plurality of blanks, each of said blanks having a tapped hole in the center thereof, means for so indexing said member as to bring each blank into operative relation to a number of stations, two of said stations serving as loading and unloading stations, means at one station for cutting grooves in the blanks, means at another station for drilling two holes through the blank and for cutting a slot in each blank, means at another station for drilling two additional holes through each blank, means at two other stations for counterboring said four drilled holes into the tapped hole in the blank to form cutting edges, and means at another station for so chamfering each blank as to relieve said cutting edges adjacent to one side of each blank.

21. In a machine, the combination comprising a turret adapted to carry a plurality of blanks, each of said blanks having a tapped hole in the center thereof, means for indexing said turret to bring each blank successively into operative relation to a number of stations, two of said stations serving as loading and unloading stations, means at one station for stamping the blanks, means at another station for cutting grooves in the blanks, means at another station for drilling two holes through each blank and for cutting a slot in each blank, means at another station for drilling two additional holes through each blank, means at two other stations for counterboring said four drilled holes into the tapped hole in the blank to form cutting edges, and means at another station for so chamfering each blank as to relieve said cutting edges adjacent to one side of the blank.

22. In a machine, the combination comprising a turret adapted to carry a plurality of blanks, each of said blanks having a tapped hole in the center thereof, means for indexing said turret to bring each blank successively into operative relation to a number of stations, two of said stations serving as loading and unloading stations, automatic means at one station for stamping the blanks, automatic means at another station for cutting grooves in the blanks, automatic means at another station for drilling two holes through the blank and for cutting a slot in each blank, automatic means at another station for drilling two additional holes through each blank, automatic means at two other stations for counterboring said four drilled holes into the tapped hole in the center of the blank to form cutting edges, and automatic means at another station for so chamfering each blank as to relieve said cutting edges adjacent to one side of the blank.

23. In a machine, the combination with a turret adapted to carry a plurality of blanks, each of said blanks having a hole in the center thereof, and means for indexing said turret to bring each blank successively into operative relation to a number of stations, of means for cutting grooves in the blanks at one station, means at another station for simultaneously drilling holes in each blank from opposite sides thereof while cutting a slot in the side of each blank, means for simultaneously drilling two additional holes in each blank from opposite sides thereof at another station, means for counterboring said drilled holes at two other stations to extend into said center hole to form cutting edges, and means for chamfering the metal between each two drilled holes to relieve each cutting edge on both sides of the blank.

24. In a machine, the combination with a turret adapted to carry a plurality of blanks, each of said blanks having a tapped hole in the center thereof, and means for indexing said turret to bring each blank successively into operative relation to a number of stations, of means for stamping said blanks at one station, means for cutting grooves in the blanks at another station, means at another station for simultaneously drilling holes in each blank from opposite sides thereof while cutting a slot in the side of the blank, means at another station for simultaneously drilling two additional holes in each blank from opposite sides thereof, means for counterboring said drilled holes at two other stations to extend into the tapped hole and form cutting edges, and means for chamfering the metal between each two drilled holes to relieve each cutting edge on both sides of the blank.

25. In a machine, the combination with a turret adapted to carry a plurality of blanks, each of said blanks having a tapped hole in the center thereof, and means for indexing said turret to bring each blank successively into operative relation to a number of stations, of means for stamping said blanks at one station, means for cutting grooves in the blanks at another station, means at another station for simultaneously drilling holes in each blank adjacent to the tapped hole and from opposite sides thereof while cutting a slot in the side of the blank, means for simultaneously drilling two additional holes in each blank from opposite sides thereof at another station, means for counterboring two of said drilled holes from opposite sides of the blank at another station to extend the drilled holes into the tapped hole in the center of the blank, means for counterboring the remaining two drilled holes in a similar manner to the counterboring at the last station, and means for chamfering the metal between each two drilled holes to relieve each cutting edge adjacent one side of the blank.

26. In a machine, the combination with a turret adapted to carry a plurality of blanks, each of said blanks having a tapped hole in the center thereof, and means for indexing said turret to bring each blank successively into operative relation to a number of stations, of means for cutting grooves in the blanks at one station, means at another station for simultaneously drilling holes in each blank adjacent to the tapped hole and from opposite sides thereof while cutting a slot in the side of the blank, means at another station for simultaneously drilling two additional holes in each blank from opposite sides thereof, means at another station for counterboring two of said drilled holes from opposite sides of the blank to extend the drilled holes into the tapped hole in the center of the blank, means for counterboring the remaining two drilled holes in a similar manner to the counterboring at the last station, and means for chamfering the metal between each two drilled holes to relieve each cutting edge on one side of the blank.

27. In a machine, the combination with a member adapted to carry a plurality of blanks, automatic means for drilling holes in the blanks, an anvil located on one side of said member, and a ram located on the other side of said member, of a stamping die carried by said ram, means for indexing said member to bring the blanks successively into operative relation to said anvil and ram and successively into operative relation to said drilling means, a cam member, and means operated by said cam member for operating said anvil and ram to obtain an impression of the stamping die on the blanks.

28. In a machine, the combination with a member adapted to carry a plurality of blanks, automatic means for drilling holes in the blanks, an anvil located on one side of said member, and a ram located on the other side of said member, of a stamping die carried by said ram, means for indexing said member to bring the blanks successively into operative relation to said anvil and ram, a cam member operated in timed relation to said indexing means, and means operated by said cam member for operating said anvil and ram to obtain an impression of the stamping die on each blank.

29. In a machine, the combination with a turret adapted to carry a plurality of blanks, each of said blanks having a tapped hole extending through it, automatic means for drilling holes in each blank in spaced relation to the tapped hole, an anvil located on one side of said turret, a ram member located on the other side of the turret, a stamping die carried by said ram, levers for respectively operating the anvil and the ram, and a rod serving as a brace and as a fulcrum for said levers, of means for indexing said turret to bring the blanks successively into operative relation to said anvil and ram and successively into operative relation to the drilling means, a cam member operated in timed relation to said indexing means, and means operated by said cam members for operating said levers to obtain an impression of the stamping die on the blanks.

30. In a machine, the combination with a turret adapted to carry a plurality of blanks, automatic means for drilling holes in the blanks, an anvil located on one side of said turret, a ram carrying a stamping die and located on the opposite side of said turret, and means for so indexing the turret as to bring the blanks not only successively into operative relation to the anvil and the ram but also successively into operative relation to the drilling means, of two levers for respectively operating the anvil and the ram into engagement with the blanks, a rod mounted on the frame of the machine and serving as a fulcrum for the two levers, a cam member operated in timed relation to said indexing means, and means comprising a toggle joint operated by said cam member for operating said levers to obtain an impression of the stamping die on each blank.

31. In a machine, the combination with a turret adapted to carry a plurality of blanks, each of said blanks having a tapped hole extending through it, an anvil located on one side of the turret, a ram carrying a stamping die and located on the opposite side of the turret, and means for so indexing the turret as to bring the blanks successively into operative relation to the ram and the anvil, of means comprising two levers for respectively operating the anvil and the ram into engagement with the blanks, a rod mounted on the frame of the machine and serving as a fulcrum for the two levers, a cam member automatically operated in timed relation to said indexing means, and means comprising a toggle joint operated by said cam member for operating said levers to obtain an impression of the stamping die on each blank in a fixed position relative to the tapped hole in the blank.

32. In a machine for operating on a blank, the combination with a plurality of milling cutters and automatic means for moving a blank into and out of position to be operated on by said milling cutters, of means for axially moving said cutters into operative position relative to the blank, means for moving the milling cutters transversely into engagement with the blank, and means for effecting the axial and transverse movements of the cutters in timed relation to the movement of the blank.

33. In a machine for operating on blanks, the combination with a plurality of milling cutters and automatic means for moving a number of blanks successively into position to be operated on by said milling cutters, of means for axially moving said cutters into operative position relative to the blank in operative position, means for moving the milling cutters transversely into engagement with the blank in operative position, and means for effecting the axial and transverse movements of the cutters in timed relation to the movement of the blanks.

34. In a machine for operating on blanks, the combination with two milling cutters and automatic means for moving a number of blanks successively into position to be operated on by said milling cutters, of automatic means for axially moving said cutters into operative position relative to the blank in operative position, automatic means for moving the milling cutters transversely into engagement with the blank in operative position, and means for effecting the axial and transverse movements of the cutters in timed relation to the movement of the blanks.

35. In a machine for operating on a blank, the combination with a plurality of milling cutters, and automatic means for moving a blank into and out of position to be operated on by said milling cutters, of a cam member for axially moving said cutters into operative position relative to the blank, a second cam member for moving the milling cutters transversely into engagement with said blank, and means for operating said cam members in timed relation to the operation of said blank-moving means.

36. In a machine for operating on a blank, the combination with two rotatable milling cutters, and automatic means for moving a blank into and out of position to be operated on by said cutters, of automatic means comprising a cam member for axially moving said cutters into and out of operative relation to said blank, automatic means comprising a second cam member for moving said cutters transversely into engagement with said blank, and means for operating said cam members in timed relation to the operation of said blank operating means.

37. In a machine for operating on a blank, the combination with two rotatable milling cutters, and automatic means for moving a blank into and out of position to be operated on by said cutters, of automatic means comprising a cam member for axially moving said cutters into operative position relative to the blank, automatic means comprising a second cam member for moving said cutters transversely into engagement with said blank, and means for operating said cam members in timed relation to the operation of said blank operating means.

38. In a machine for operating on a blank adapted to fit in a die stock, the combination with metal cutting means adapted to form grooves in a blank for securing it to a die stock, and means for moving said blank into and out of position to be operated on by said metal cutting means, of automatic means for moving said metal cutting means into and out of operative position to said blank in timed relation to said blank operating means.

39. In a machine, the combination with a turret adapted to carry a plurality of blanks, two milling cutters for forming grooves in the sides of the blanks, and means for indexing the turret to bring the blanks successively into position to be operated on by said milling cutters, of a cam member for axially moving said milling cutters into operative relation to the blanks, a cam member for moving the cutters transversely into engagement with the blank indexed to operative position, and means for operating said cam members in timed relation to said indexing means.

40. In a machine for operating on a blank, the combination with two rotating milling cutters having their axes parallel to the axis of the blank to be operated on and automatic means for moving the blank into and out of operative position with respect to the cutters, of means for axially moving said milling cutters into operative relation to the blank, auxiliary means for moving the cutters transversely into engagement with the blank, and means for effecting the axial and transverse movements of the cutters in timed relation to the movement of the blank.

41. In a machine for operating on blanks, the combination with a plurality of rotating milling cutters having their axes parallel to the axes of the blanks to be operated on and automatic means for moving the blank successively into operative position to be operated on by said cutters, of means for axially moving said milling cutters into operative relation to the blank in operative position, means for moving the cutters transversely into engagement with the blank in operative position, and means for effecting the axial and the transverse movements of the cutters in timed relation to the movement of the blanks.

42. In a machine for operating on blanks, the combination with two rotating milling cutters having their axes parallel to the axes of the blanks to be operated on and automatic means for moving the blanks successively into position to be operated on by said cutters, of means for axially moving said milling cutters into operative relation to the blank in operative position, auxiliary means for moving the cutters transversely into engagement with the blank in operative position, and means for effecting the axial and the transverse movements of the cutters in timed relation to the movement of the blanks.

43. In a machine, the combination with a member adapted to carry a plurality of blanks, two rotating milling cutters having their axes parallel to the axes of the blanks in said member, and means for indexing said member to bring the blanks successively into position to be operated on by said milling cutters, of a cam member for axially moving said milling cutters into operative relation to the blanks, a cam member for moving the cutters transversely into engagement with the blank indexed to operative position, and means for operating said cam members in timed relation to said indexing means.

44. In a machine, the combination with a turret adapted to carry a plurality of blanks, two rotating milling cutters, and automatic means for indexing said turret to bring the blanks succesively into position to be operated on by said milling cutters, of means comprising a cam member for axially moving the cutters into and out of operative position to the blank indexed to operative position, a second member for moving said cutters into engagement with the indexed blank, and means for automatically operating said cam members in timed relation to the indexing operation.

45. In a machine for operating on a blank, the combination with a rotatable milling cutter, and automatic means for moving a blank into and out of position to be operated on by said cutter, of automatic means for axially moving said cutter into and out of operative relation to said blank, automatic means for moving said cutter transversely into engagement with said blank, and means for operating said cutter-operating means in timed relation to the operation of said blank-operating means.

46. In a machine, the combination with a turret adapted to carry a plurality of blanks, a rotatable milling cutter adapted to engage said blanks, and means for indexing said turret to bring the blanks successively into operative relation to said cutter, of automatic means for axially moving said cutter into and out of operative position to the blank indexed to operative position, means for moving the cutter, when in operative position, into engagement with the indexed blank, and means for automatically operating said cutter-operating means in timed relation to said indexing means.

47. In an automatic machine for operating on a blank having a tapped hole in the center thereof, the combination with automatic means for moving the blank into and out of operative position with respect to a drilling and slotting station and to a counterboring station, of automatic means located at the drilling and slotting stations for drilling a number of holes through the blank while cutting a slot in the side thereof, automatic means at the counterboring station for counterboring the holes drilled at the drilling station to extend into the tapped hole in the center of the blank, and means for effecting operation of the drilling, slotting and counterboring means in timed relation to the blank moving means.

48. In an automatic machine for operating on a plurality of blanks each having a tapped hole in the center thereof, the combination with automatic means for moving the blanks successively into operative position with respect to a drilling station and to a counterboring station, of automatic means located at the drilling station for simultaneously drilling a number of holes through the blank in operative position, automatic means at the counterboring station for counterboring the holes drilled at the drilling station to extend into the tapped hole in the center of the blank, and means for effecting operation of the drilling and counterboring means in timed relation to the blank moving means.

49. In an automatic machine for operating on a plurality of blanks each having a tapped hole in the center thereof, the combination with automatic means for moving the blanks succesively into operative position to a drilling and slotting station and to a counterboring station, of automatic means located at the drilling and slotting stations for simultaneously drilling a number of holes through the blank in operative position while cutting a slot in the side of the blank, automatic means at the counterboring station for counterboring the holes drilled at the drilling and slotting stations to extend into the tapped hole in the center of the blank, and means for effecting operation of the drilling, slotting and counterboring means in timed relation to the blank moving means.

50. In a machine, the combination with a turret adapted to carry a plurality of blanks, each of said blanks having a tapped hole in the center thereof, and means for indexing said turret to bring the blanks succesively into operative relation to a counterboring station and to a drilling station, of means located at the drilling station for simultaneously drilling a number of holes through each blank when in operative position and from opposite sides of the turret, said means operating the drilling means in timed relation to the operation of said indexing means, and means located at said counterboring station and operated in timed relation to the indexing means for simultaneously counterboring said drilled holes to extend into the tapped hole.

51. In a machine, the combination with a turret adapted to carry a plurality of blanks, each of said blanks having a tapped hole in the center thereof, and means for indexing said turret to bring the blanks successively into operative relation to a counterboring station and to a slotting and drilling station, of means located at said drilling and slotting station for cutting a slot in the side of each blank and for drilling a plurality of holes through the blank, said drilling and slotting means being operated in timed relation to the operation of said indexing means, and means located at said counterboring station and operated in timed relation to the indexing means for simultaneously counterboring the drilled holes to extend into the tapped holes.

52. In a machine, the combination with a turret adapted to carry a plurality of blanks, each of said blanks having a tapped hole in the center thereof, and means for indexing said turret to bring the blanks successively into operative relation to a counterboring station and to a drilling station, of means located at said drilling station and operated in timed relation to the operation of said indexing means for simultaneously drilling two holes through each blank when indexed to operative position, and means located at said counterboring station and operated in timed relation to the operation of the indexing means for simultaneously counterboring the two drilled holes to extend into the tapped hole.

53. In a machine, the combination with a turret adapted to carry a plurality of blanks, each of said blanks having a tapped hole in the center thereof, and means for indexing said turret to bring the blanks successively into operative relation to a drilling and slotting station and to a counterboring station, of means located at said drilling and slotting station for cutting an axial slot in the side of each blank when indexed to operative position, means also located at said drilling and slotting station for drilling holes through each blank from opposite sides thereof, means located at said counterboring station for extending the drilled holes into the tapped hole in each blank, and means for governing the operation of said slotting and drilling means and said counterboring means in timed relation to the operation of said indexing means.

54. In a machine, the combination with a turret adapted to carry a plurality of blanks, a slide member located on each side of the turret, and means for indexing said turret to bring the blanks successively into operative relation to a number of drilling stations, of means comprising drilling tools located at each drilling station for simultaneously drilling a hole from each side of the turret through each blank when indexed to operative position, the drilling tools located on one side of said turret being carried by one of said slide members and the drilling tools located on the opposite side of the turret being carried by the other slide member, and means for operating said slide members to effect operation of said drilling means in timed relation to the operation of said indexing means.

55. In a machine, the combination with a turret adapted to carry a plurality of blanks, a slide member located on each side of the turret, and means for indexing said turret to bring the blanks successively into operative relation to a drilling and slotting station and to a drilling station, of means located at said drilling and slotting station for cutting an axial slot in the side of each blank when indexed to operative position, means comprising drilling tools located at each of said stations for simultaneously drilling a hole from each side of the turret through each blank when indexed to operative position, the drilling tools located on one side of said turret being carried by one of said slide members and the drilling tools located on the opposite side of the turret being carried by the other slide member, and means for operating said slide members to effect operation of said drilling means in timed relation to the operation of said indexing means.

56. In a machine, the combination with a member adapted to carry a blank, said blank having a tapped hole in the center thereof, and means for automatically operating said member to move the blank into and out of operative relation to a drilling and slotting station, of means located at said station for cutting an axial slot in the side of the blank when in operative position, means located at said station for simultaneously drilling a hole through the blank from each side thereof, said holes being drilled adjacent to said tapped hole and in fixed position relative to the position of the slot being cut in the side of the blank, and means for effecting simultaneous operation of said slotting means and the drilling means in timed relation to the operation of said member carrying the blank.

57. In an automatic machine, the combination with a member adapted to carry a blank having a tapped hole in the center thereof and automatic means for operating said member to move the blank into and out of operative relation to a drilling and slotting station, of means located at said station for cutting an axial slot in the side of the blank while drilling two holes therethrough, said holes being drilled from opposite sides of the blank, and means for effecting operation of the drilling and slotting means in timed relation to the blank moving means.

58. In an automatic machine, the combination with a member adapted to carry a plurality of blanks each having a tapped hole in the center thereof and automatic means for operating said member to move the blanks successively into operative position with respect to a drilling and slotting station, of means located at said station for cutting an axial slot in the side of the blank in operative position while drilling two holes through the blank, said holes being drilled from opposite sides of the blank, and means for effecting operation of the drilling and slotting means in timed relation to the blank moving means.

59. In a machine, the combination with a turret adapted to carry a plurality of blanks, each of said blanks having a tapped hole in the center thereof, and means for indexing said turret to bring the blanks successively into operative relation to a drilling and slotting station, of means located at said station for cutting an axial slot in the side of each blank when indexed to operative position, means located at said station for simultaneously drilling holes through each blank when indexed to operative position, said holes being drilled from opposite sides of the blank and in fixed position relative to the slot being cut in the blank, and means for effecting operation of the slotting means and the drilling means in timed relation to the operation of said indexing means.

60. In a machine, the combination with a turret adapted to carry a plurality of blanks, each of said blanks having a tapped hole in the center thereof, and means for indexing said turret to bring the blanks successively into operative relation to a drilling and slotting station, of means located at said station for automatically cutting an axial slot in each blank when indexed to operative position, means located at said station for drilling two holes through each blank in fixed position relative to the position of the slot being cut in the blank, said holes being drilled from opposite sides of the blank and adjacent to said tapped hole, and automatic means for effecting operation of the drilling and the slotting means in timed relation to the operation of said indexing means.

61. In a machine, the combination with a turret adapted to carry a plurality of blanks, a slide member located on each side of the turret, each of said blanks having a plurality of drilled holes in it, and means for indexing said turret to bring each blank into operative relation to a plurality of counterboring stations, of means comprising counterboring tools located at each of said stations for simultaneously counterboring one of said drilled holes from each side of each blank when indexed to operative position, the counterboring tools located on one side of said turret being carried by one of said slides and the tools on the opposite side of the turret being carried by the other slide, and means for operating said slide members to effect operation of said counterboring means in timed relation to the operation of said indexing means.

62. In a machine, the combination with a turret adapted to carry a plurality of blanks, a slide member located on each side of the turret, each of said blanks having a tapped hole in the center thereof and a plurality of drilled holes in spaced relation to the tapped hole, and means for indexing said turret to bring the blanks successively into operative relation to a plurality of counterboring stations, of means comprising counterboring tools located at each of said stations for simultaneously counterboring one of said drilled holes from each side of the turret, the counterboring tools located on one side of said turret being carried by one of said slide members and the tools located on the opposite side of the turret being carried by the other slide member, and means for operating said slide members to effect operation of said counterboring means in timed relation to the operation of said indexing means.

63. In an automatic machine, the combination with a member adapted to carry a blank having a tapped hole in the center thereof and a number of drilled holes in spaced relation to the tapped hole, and means for operating said member to move the blank into and out of operative position to a counterboring station, of means located at said station for so counterboring each drilled hole as to extend into the tapped hole and form cutting edges, and means for effecting operation of the counterboring means in timed relation to the operation of the blank moving means.

64. In an automatic machine, the combination with a member adapted to carry a plurality of blanks each having a tapped hole in the center thereof and a number of drilled holes in spaced relation to the tapped hole, and means for operating said member to successively move the blanks into operative position to a counterboring station, of means located at said station for so counterboring each drilled hole as to extend into said tapped hole and form cutting edges, and means for effecting operation of said counterboring means in timed relation to the operation of the blank moving means.

65. In a machine, the combination with a turret adapted to carry a plurality of blanks, each of said blanks having a tapped hole in the center thereof and a number of drilled holes in spaced relation to the tapped hole, and means for indexing said turret to bring each blank into operative relation to a counterboring station, of means located at said station for so counterboring each drilled hole as to extend into said tapped hole and form cutting edges, and means for effecting operation of said counterboring means in timed relation to the operation of said indexing means.

66. In a machine, the combination with a turret adapted to carry a plurality of blanks, each of said blanks having a tapped hole in the center thereof and a number of drilled holes in spaced relation to the tapped hole, and means for indexing said turret to bring each blank into operative relation to a counterboring station, of means located at said station for simultaneously counterboring two of said drilled holes to extend into said tapped hole and form cutting edges, said two holes being counterbored from opposite sides of the blank, and means for effecting operation of the counterboring means in timed relation to the operation of the indexing means.

67. In a machine, the combination with a member adapted to carry a blank, said blank having a tapped hole in the center thereof and a number of drilled holes in spaced relation to the tapped hole, and automatic means for operating said member to move the blank into and out of operative relation to a counterboring station, of means located at said station for simultaneously counterboring a number of said drilled holes to extend into the tapped hole and form cutting edges, and means for effecting operation of said counterboring means in timed relation to the operation of said indexing means.

68. In a machine, the combination with a member adapted to carry a blank, said blank having a tapped hole in the center thereof and a number of drilled holes in spaced relation to the tapped hole, and automatic means for operating said member to move the blank into and out of operative relation to a counterboring station, of means located at said station for simultaneously counterboring two of said drilled holes to extend into said tapped hole and form cutting edges, said two holes being counterbored from opposite sides of the blank, and means for effecting operation of the counterboring means in timed relation to the operation of the indexing means.

69. In an automatic machine, the combination with a member adapted to carry a blank having a tapped hole in the center thereof and a plurality of holes which extend into the tapped hole to form cutting edges, and automatic means for operating said member to move the blank into and out of operative relation to a chamfering station, of a chamfering tool located at said station, means for indexing said tool to relieve the cutting edges adjacent one side of the blank, and means for effecting operation of the indexing means in timed relation to the blank moving means.

70. In an automatic machine, the combination with a member adapted to carry a plurality of blanks, each of said blanks having a tapped hole in the center thereof and a plurality of holes which extend into the tapped hole to form cutting edges, and automatic means for operating said member to move the blanks successively into operative relation to a chamfering station, of a chamfering tool located at said station, means for indexing said tool to relieve the cutting edges adjacent one side of the blank in operative position, and means for effecting operation of the indexing means in timed relation to the blank moving means.

71. In an automatic machine, the combination with a rotating turret adapted to carry a plurality of blanks, each of said blanks having a tapped hole in the center thereof and a plurality of holes which extend into the tapped hole to form cutting edges, and automatic means for indexing said turret to move the blanks successively into operative relation to a chamfering station, of a chamfering tool located at said station, means for indexing said tool to relieve the cutting edges adjacent one side of the blank in operative position, and means for effecting operation of the turret indexing means in timed relation to the means for indexing the chamfering tool.

72. In an automatic machine, the combination with a member adapted to carry a blank, said blank having a tapped hole in the center thereof and a plurality of holes which extend into the tapped hole to form cutting edges, and automatic means for operating said member to move the blank into and out of operative relation to a chamfering station, of a chamfering tool located on each side of said member at the chamfering station, means for indexing said tools to relieve the cutting edges adjacent each side of the blank, and means for effecting operation of the indexing means in timed relation to the blank moving means.

73. In a machine, the combination with a member adapted to carry a blank, said blank having a tapped hole in the center thereof and a plurality of holes which extend into the tapped hole to form cutting edges, and automatic means for operating said member to move the blank into and out of operative relation to a chamfering station, of means located at said station for relieving the cutting edges of the blank adjacent to one side thereof by a chamfering operation, and means for effecting operation of the chamfering means in timed relation to the operation of said blank-moving means.

74. In a machine for making dies, the combination with a member carrying a blank, said blank having a tapped hole in the center thereof and a plurality of holes which extend into the tapped hole to form cutting edges, and automatic means for operating said member to move the blank into and out of operative relation to a chamfering station, of means located at said station for relieving the cutting edges adjacent both sides of the blank by a chamfering operation, and means for effecting operation of the chamfering means in timed relation to the operation of the means for moving the blank.

75. In a machine for making dies, the combination with a turret carrying a plurality of blanks, each of said blanks having a tapped hole in the center thereof and a plurality of holes which extend into the tapped hole to form cutting edges, and means for indexing said turret to bring each blank into operative relation to the chamfering station, of means located at said station for relieving the cutting edges adjacent one side of each blank by a chamfering operation, and means for effecting operation of the chamfering means in timed relation to the operation of said indexing means.

76. In a machine for making dies, the combination with a turret carrying a plurality of blanks, each of said blanks having a tapped hole in the center thereof and a plurality of holes which extend into the tapped hole to form cutting edges, and means for indexing said turret to bring each blank into operative relation to a chamfering station, of means located at said station for relieving the cutting edges adjacent both sides of each blank by a chamfering operation, and means for effecting operation of the chamfering means in timed relation to the operation of said indexing means.

77. In a machine for making dies, the combination with a turret carrying a plurality of blanks, each of said blanks having a tapped hole in the center thereof, portions of the side of said tapped hole in each blank being cut away to form cutting edges parallel to the axis of the blank, and means for indexing said turret to move the blanks successively into operative relation to a chamfering station, of means located at said station for relieving the cutting edges adjacent one side of each blank by a chamfering operation, and means for effecting operation of the chamfering means in timed relation to the operation of said indexing means.

78. In a machine for making dies, the combination with a turret carrying a plurality of blanks, each of said blanks having a tapped hole in the center thereof, portions of the side of the tapped hole in each blank being cut away to form cutting edges, and means for indexing said turret to bring the blanks successively into operative relation to a chamfering station, of a rotating chamfering tool, means for varying the position of the axis of rotation of the tool relative to the axis of each blank when in operative position to relieve the cutting edges adjacent one side of each blank, and means for effecting operation of said tool varying means in timed relation to the operation of said indexing means.

79. In an automatic machine, the combination with a member adapted to carry a blank having a tapped hole in the center thereof, portions of the sides of the tapped hole in the blank being cut away to form cutting edges, and automatic means for operating said member to move the blank into and out of operative relation to a chamfering station, of a rotating chamfering tool located at the station, means for indexing said tool to relieve the cutting edges adjacent one side of the blank, and means for effecting operation of the indexing means in timed relation to the blank moving means.

80. In a machine, the combination with a member adapted to carry a blank, said blank having a tapped hole in the center thereof, portions of the side of the tapped hole in the blank being cut away to form cutting edges, and automatic means for operating said member to move the blank into and out of operative relation to a chamfering station, of a rotating chamfering tool located at said station, means for intermittently varying the axis of rotation of the tool relative to the axis of the blank when in operative position to relieve the cutting edges adjacent one side of the blank, and means for effecting operation of the chamfering-tool varying means in timed relation to the operation of said blank moving means.

81. In an automatic machine, the combination with a turret adapted to carry a plurality of blanks each having a tapped hole in the center thereof, portions of the side of the tapped hole in each blank being cut away to form cutting edges, and means for indexing said turret to move the blanks successively into operative relation to a chamfering station, of a rotating chamfering tool located on each side of the turret at the chamfering station, means for indexing each of said tools to relieve the cutting edges adjacent each side of the blank in operative positions, and means for effecting operation of said two indexing means in timed relation to the operation of said turret indexing means.

82. In a machine, the combination with a turret adapted to carry a plurality of blanks, each of said blanks having a tapped hole in the center thereof, portions of the side of the tapped hole in each blank being cut away to form cutting edges, and means for indexing said turret to move the blanks successively into operative relation to a chamfering station, of a rotating chamfering tool located on each side of the turret at the chamfering station, means for intermittently varying the axis of rotation of each of said tools relative to the axis of the blank in operative position to relieve the cutting edges adjacent each side of the blank, and means for effecting operation of said intermittent means in timed relation to the operation of said indexing means.

83. In a machine, the combination with a rotatable tool and a rotatable sleeve for supporting said tool, of means comprising two adjustable rings for varying the position of the axis of rotation of the tool relative to the axis of rotation of the sleeve, and means for indexing said sleeve to vary the position of the axis of rotation of said tool.

84. In a machine, the combination with a rotatable tool and a rotatable sleeve for supporting said tool, of means comprising two adjustable rings for varying the distance between the axis of rotation of the tool and the axis of rotation of the sleeve, and means for indexing said sleeve to vary the position of the axis of rotation of said tool and for axially reciprocating the tool.

85. In a machine, the combination with a rotatable tool and a rotatable sleeve mechanism for supporting said tool, of means for adjusting the axis of rotation of the tool in said sleeve mechanism a predetermined distance from the axis of rotation of the sleeve mechanism, means for intermittently giving said sleeve mechanism a movement of rotation to vary the position of the axis of rotation of the tool and for axially moving the tool in timed relation to the rotation of the sleeve mechanism.

86. In a machine, the combination with a rotatable tool, a rotatable sleeve mechanism for supporting said tool, and a slide member for carrying said tool and the sleeve mechanism, of means for adjusting the axis of rotation of the tool a predetermined distance from the axis of rotation of the sleeve mechanism, means comprising an indexing mechanism for intermittently rotating said sleeve mechanism to vary the position of the axis of rotation of the tool, and means for operating said indexing mechanism and for reciprocating said slide in timed relation.

87. In a machine, the combination with a rotatable tool, a rotatable sleeve mechanism for supporting said tool, means for varying the distance between the axis of rotation of the sleeve and the axis of rotation of the tool and means for varying the position of the axis of rotation of the tool, of means for reciprocating the tool in timed relation to said means for varying the position of the axis of rotation.

88. In a machine, the combination with a rotatable tool, a sleeve mechanism for supporting said tool, a main slide for supporting said sleeve, and means for adjusting the axis of rotation of the tool a predetermined distance from the axis of rotation of the sleeve, of an indexing mechanism mounted on said sleeve, and automatic means for operating said indexing means to rotate said sleeve and vary the position of the tool axis, while reciprocating said slide.

89. In a machine, the combination with a rotatable tool, a sleeve mechanism for supporting said tool, a main slide for supporting said sleeve mechanism, and means for adjusting the axis of rotation of the tool a predetermined distance from the axis of rotation of the sleeve mechanism, of an indexing mechanism mounted on said sleeve mechanism, a latch member mounted on said slide for controlling the indexing mechanism to intermittently revolve the tool axis about the axis of rotation of the sleeve mechanism, and automatic means for operating said slide to reciprocate the tool while moving the latch member to control said indexing mechanism.

90. In a machine for making dies, the combination with a rotatable tool, a sleeve mechanism for supporting said tool, a slide for supporting said sleeve mechanism, means for adjusting the axis of rotation of the tool a predetermined distance from the axis of rotation of the sleeve mechanism, and an indexing mechanism comprising two notched plates mounted on said sleeve mechanism, of a latch member mounted on said slide for cooperating with said plates to effect indexing of the sleeve mechanism, and automatic means for operating said slide to reciprocate the tool and for moving the latch member to control said indexing mechanism.

91. In a machine for making dies, the combination with a rotatable tool, a sleeve mechanism for supporting said tool, a slide for supporting said sleeve mechanism, means for adjusting the axis of rotation of the tool a predetermined distance from the axis of rotation of the sleeve mechanism, an indexing mechanism comprising two notched plates mounted on said sleeve mechanism and fixedly connected together, a constantly rotating gear wheel mounted on said sleeve mechanism, and a friction clutch for connecting said gear wheel to said plates, of a latch member mounted on said slide for controlling said plates to effect indexing of the sleeve mechanism, and automatic means for operating said slide to reciprocate the tool and for moving the latch member to control the rotation of said plates and the sleeve mechanism.

92. In an indexing mechanism, the combination with a rotatable sleeve mechanism, two notched plates mounted on said sleeve mechanism, a constantly rotating gear wheel mounted on said sleeve, a friction clutch mechanism for connecting said gear wheel to the notched plates, and a latch member having a projecting portion adapted to enter the notches in said plates to control the indexing of the sleeve mechanism, of means for controlling said latch member while effecting axial movement of the sleeve mechanism.

93. In an indexing mechanism, the combination with a rotatable member, two notched plates fixedly mounted on said member, a source of power, and a yieldable clutch mechanism for connecting said plates to the source of power, of a latch member for controlling said plates to effect indexing of the rotatable member, and means for operating said latch member and for simultaneously effecting an additional movement of the rotatable member.

In testimony whereof, I hereto affix my signature.

FRIEDERICH MÜLLER.

Certificate of Correction.

It is hereby certified that in Letters Patent No. 1,540,899, granted June 9, 1925, upon the application of Friederich Müller, of Hartford, Connecticut, for an improvement in "Combined Metal-Cutting Machines," errors appear in the printed specification requiring correction as follows: Page 26, line 123, claim 74, and page 27, lines 8, 23, 38, and 53, claims 75, 76, 77, and 78, strike out the words " for making dies"; page 26, line 124, claim 74, and page 27, lines 9, 24, 39, and 54, claims 75, 76, 77, and 78, for the word "carrying" read *adapted to carry;* and that the said Letters Patent should be read with these corrections therein that the same may conform to the record of the case in the Patent Office.

Signed and sealed this 14th day of July, A. D. 1925.

[SEAL.]
WM. A. KINNAN,
*Acting Commissioner of Patents.*